(12) United States Patent
Bonerb

(10) Patent No.: US 12,194,905 B1
(45) Date of Patent: Jan. 14, 2025

(54) BULK HANDLING, LOADING AND DUMPING SYSTEM

(71) Applicant: Timothy Charles Bonerb, Rye Beach, NH (US)

(72) Inventor: Timothy Charles Bonerb, Rye Beach, NH (US)

( * ) Notice: Subject to any disclaimer, the term of this patent is extended or adjusted under 35 U.S.C. 154(b) by 0 days.

(21) Appl. No.: 18/509,670

(22) Filed: Nov. 15, 2023

(51) Int. Cl.
| | | |
|---|---|---|
| *B60P 1/22* | (2006.01) |
| *A01D 90/02* | (2006.01) |
| *A01D 90/10* | (2006.01) |
| *B60P 1/16* | (2006.01) |
| *B60P 1/26* | (2006.01) |
| *B60P 1/34* | (2006.01) |

(52) U.S. Cl.
CPC ............... *B60P 1/22* (2013.01); *A01D 90/02* (2013.01); *A01D 90/10* (2013.01); *B60P 1/16* (2013.01); *B60P 1/26* (2013.01); *B60P 1/34* (2013.01); *B60P 1/165* (2013.01); *B65F 2240/138* (2013.01)

(58) Field of Classification Search
CPC ...... A01D 43/07; A01D 75/006; A01D 90/02; A01D 90/10; B60P 1/165; B60P 1/22; B60P 1/26; B60P 1/34; B65F 3/08; B65F 3/10; B65F 2240/138
USPC ........... 298/11, 18, 22 F; 414/409, 420, 422, 414/423, 425, 482
See application file for complete search history.

(56) References Cited

U.S. PATENT DOCUMENTS

| | | | | | |
|---|---|---|---|---|---|
| 1,223,741 | A | * | 4/1917 | Schwister | ............... F15B 15/18 91/401 |
| 2,419,636 | A | * | 4/1947 | Foy | ......................... B60P 1/267 298/23 DF |
| 3,998,491 | A | * | 12/1976 | Diem | ......................... B60P 1/34 298/23 F |
| 4,749,317 | A | * | 6/1988 | Daniel | ...................... B60P 3/08 D12/1 |
| 5,230,393 | A | * | 7/1993 | Mezey | ....................... B65F 3/08 177/139 |
| 5,601,486 | A | * | 2/1997 | Schlueter | ............. A01D 46/082 56/28 |

(Continued)

FOREIGN PATENT DOCUMENTS

| | | | | | |
|---|---|---|---|---|---|
| CN | 108190327 A | * | 6/2018 | ................ B65F 3/08 |
| CN | 113459925 A | * | 10/2021 | ................ B60P 1/34 |

(Continued)

*Primary Examiner* — James Keenan

(57) ABSTRACT

A bulk handling system for collecting, loading, transporting and dumping of yard waste and landscape materials such as grass clippings, yard debris, soil, mulch, stone and other dry and/or wet substances. The functions for controlling and operating the mechanical bulk handling system include a titling lift platform for filling and dumping and a gate that when open acts as a lift to move materials into the bulk container and when closed functions as a closed door. In addition to the bulk container operating in a horizontal position for transporting, which uses virtually no floor space on the platform and/or vehicle selected for use, it can also be angled downward for filling and elevated for dumping and emptying. For filling, the gate end of bulk container and lift frame can be lowered closer to the ground from a vehicle for easier and more efficient loading by an operator.

7 Claims, 29 Drawing Sheets

(56) References Cited

U.S. PATENT DOCUMENTS

| | | | | |
|---|---|---|---|---|
| 6,206,477 | B1 * | 3/2001 | Rexus | B65F 3/046 |
| | | | | 414/487 |
| 6,817,677 | B1 * | 11/2004 | Beiler | B65F 3/26 |
| | | | | 298/22 C |
| 11,117,741 | B2 * | 9/2021 | Curley | B60P 1/649 |

FOREIGN PATENT DOCUMENTS

| | | | | |
|---|---|---|---|---|
| DE | 3720652 A1 | * | 1/1989 | B60P 1/34 |
| KR | 20100003078 U | * | 3/2010 | B60P 1/26 |

\* cited by examiner

BULK HANDLING, LOADING AND DUMPING SYSTEM

BACKGROUND OF THE INVENTION

Field of Invention

1.) The concept concerns the loading, transporting and dumping of landscape materials such as grass clippings when using a commercial mower (Exmark™) having more storage capacity than a typical riding lawn mower (Cub Cadet™). Also, the manual labor of handling and lifting, as well as the operator contact with possible tick bites involved with handling grass clippings, is virtually eliminated. As a result, the chance of suffering physical injuries and contracting LYME disease infested grass clippings is greatly reduced. cl 2.) Description of Related Art To date, the vast majority of landscape professionals use a 2 ton pick-up truck equipped with a heavy weight dump insert while pulling a landscape trailer loaded with one or more professional lawnmowers, weed eaters, rollers, supplies and tools. After a lawnmowers' grass collections bags are full from mowing, the operator drives the mower to the pick-up truck whereby the operator lifts each collection bag over the high rail system on the dump insert (on both sides) for emptying or has to position his body between the tail gate of the truck and trailer frame and trailer hitch and actually heave the contents of the collection bags over the dump system's tail gate towards the dump inserts rear wall. After a day of mowing, going from job to job, it's not unusual for the dump insert to be loaded with about 1,000 lbs. or more of grass clippings. The concept of the side discharge dump system mounted directly on a trailer or other platform, which can be elevated several feet above the trailer floor to maintain the usable floor space on the trailer, provides significant help with the lifting and loading of the grass clippings, transport and emptying via dumping.

BRIEF DESCRIPTION OF DRAWINGS

FIG. 18 is an end view of dump system secured to trailer floor with bulk container having a negative 45 degree angle from horizontal for filling equipped with a pair of rails for the collapsible, lift container to ride on.

DESCRIPTION OF DRAWINGS

Figure 1:
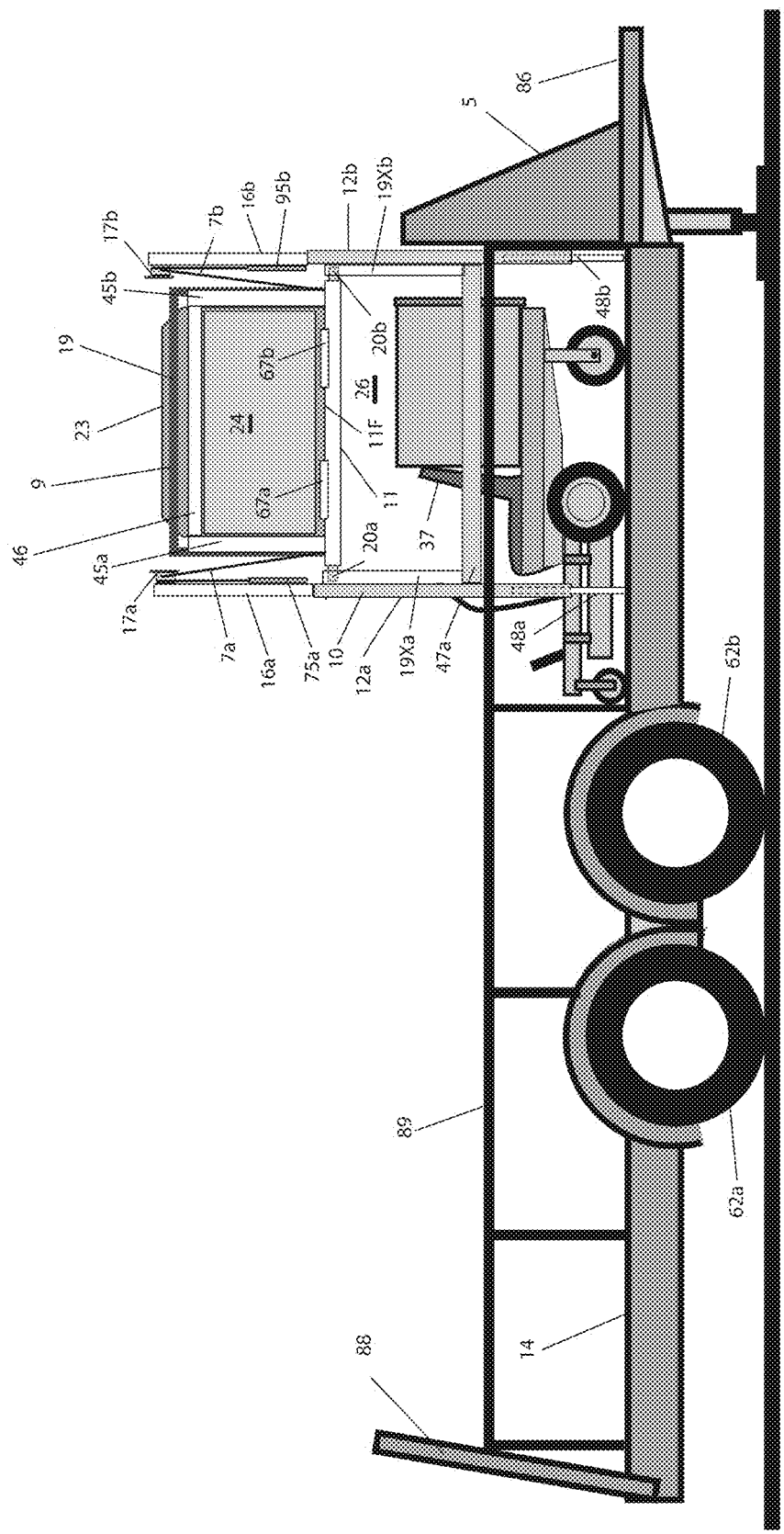
FIG. 1 is a side view of a landscape trailer with space provided for a lawnmower to be parked and secured under a side unloading dump system.
Figure 10:
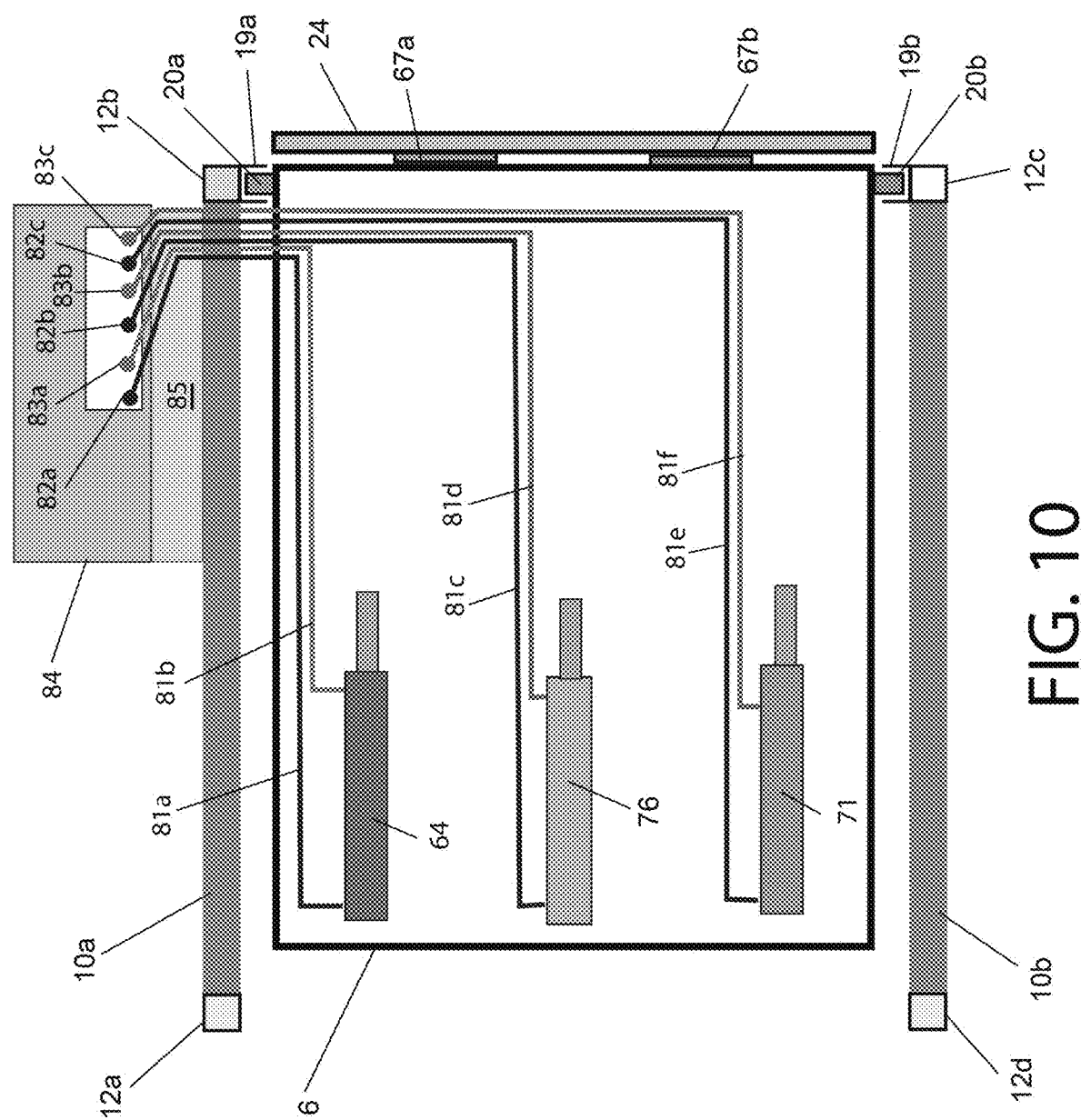
FIG. 10 is a top view of the dump systems hydraulic pump, 3 hydraulic cylinders and the hydraulic hose and hose connections between each hydraulic cylinder contained within the lift frame extending to the hydraulic pump and reservoir mounted to the base frame.

FIG. 1 is a side view of the of a landscape trailer 5 equipped with a dump system 9 mounted to a trailer floor 14. The dump frame container 44 is supported on a base frame 10 with a set of adjustable base legs 12a, 12b and 12c and 12d (FIG. 10). Dump Frame 11 is connected to base frame 10 via a set of axle brackets 20a and 20b placed inside a set of 19Xa and 19Xb respectively. Dump frame 11 is held in a horizontal position to provide storage area 26 for mower(s) 37 and other yard equipment to be stowed during transport Also shown is a set of pulley posts 16a and 16b fixed to the base frame 10 to provide the lifting movement using a set of lift cables 7a and 7b 7, a set of cable guides 17a and 17b, a cable and pulley assembly 101 (FIG. 29) and a primary hydraulic cylinder lift cylinder 64 (FIG. 10). A gate 24 is shown attached to dump frame 11 via a set of hinges 67a and 67b shown parked on the shoulder side of the trailer 5.

Figure 2:
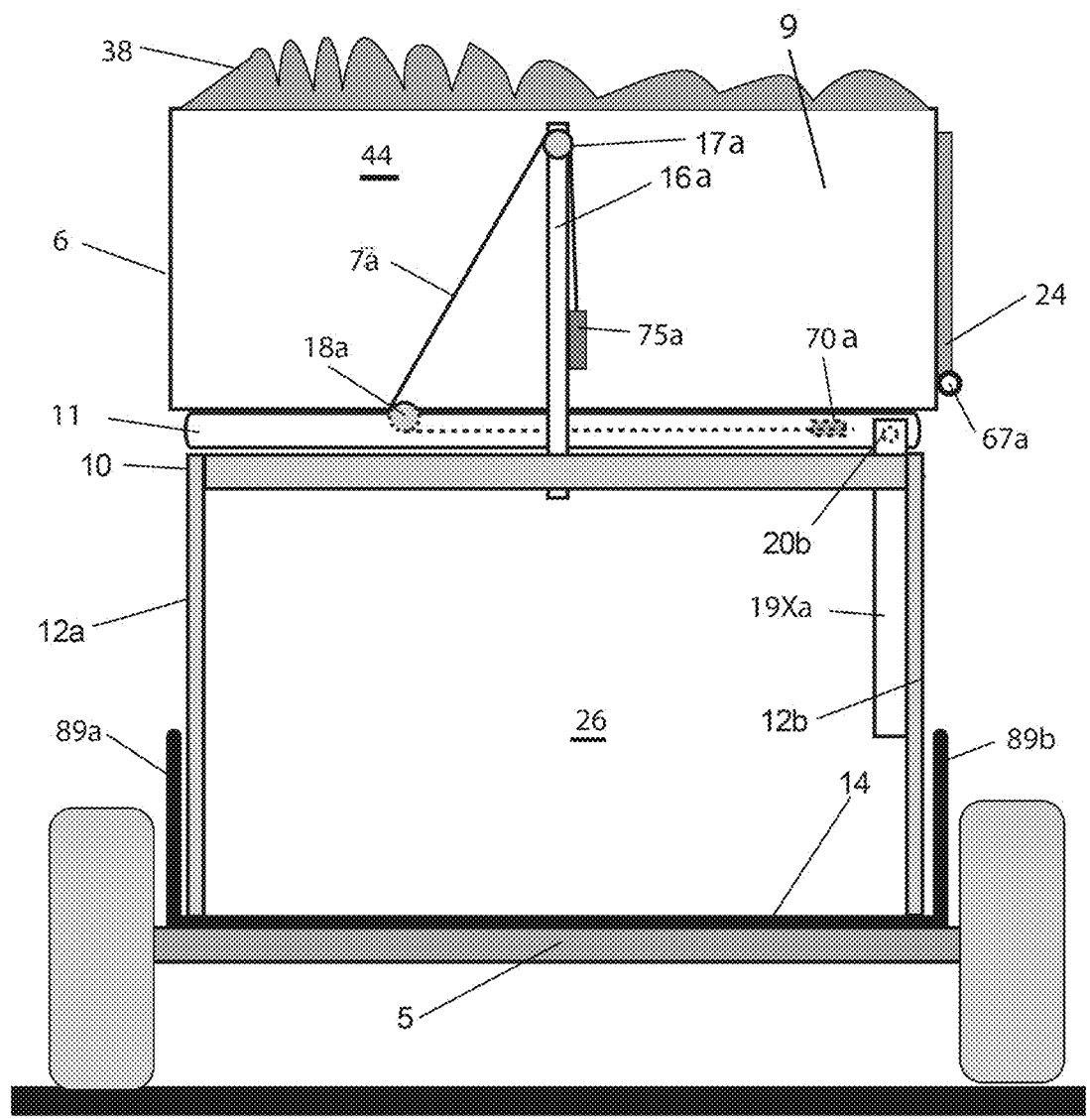
FIG. 2 is an end view of dump system with its bulk container elevated and in a raised and horizontal position above the floor of a landscape trailer.

FIG. 2 is an end view dump system 9 with base legs 12a and 12b and 12c an 12d (FIG. 10) of base frame 10 secured to the trailer floor 14. The primary lift hydraulic cylinder 64 (FIG. 10) is secured inside lift frame 11 with the cables 7a and 7b (FIG. 1) that remain inside of the lift frame 11 and exiting the lift frame 11 via a set of guide pulleys 18a and 18b (FIG. 11) respectively and then up and around a set of cable guides 17a and 17b (FIG. 1) connecting to a set of turnbuckles 75a and 75b (FIG. 24) fixed to a set of lift posts 16a and 16b (FIG. 11).

Figure 3:
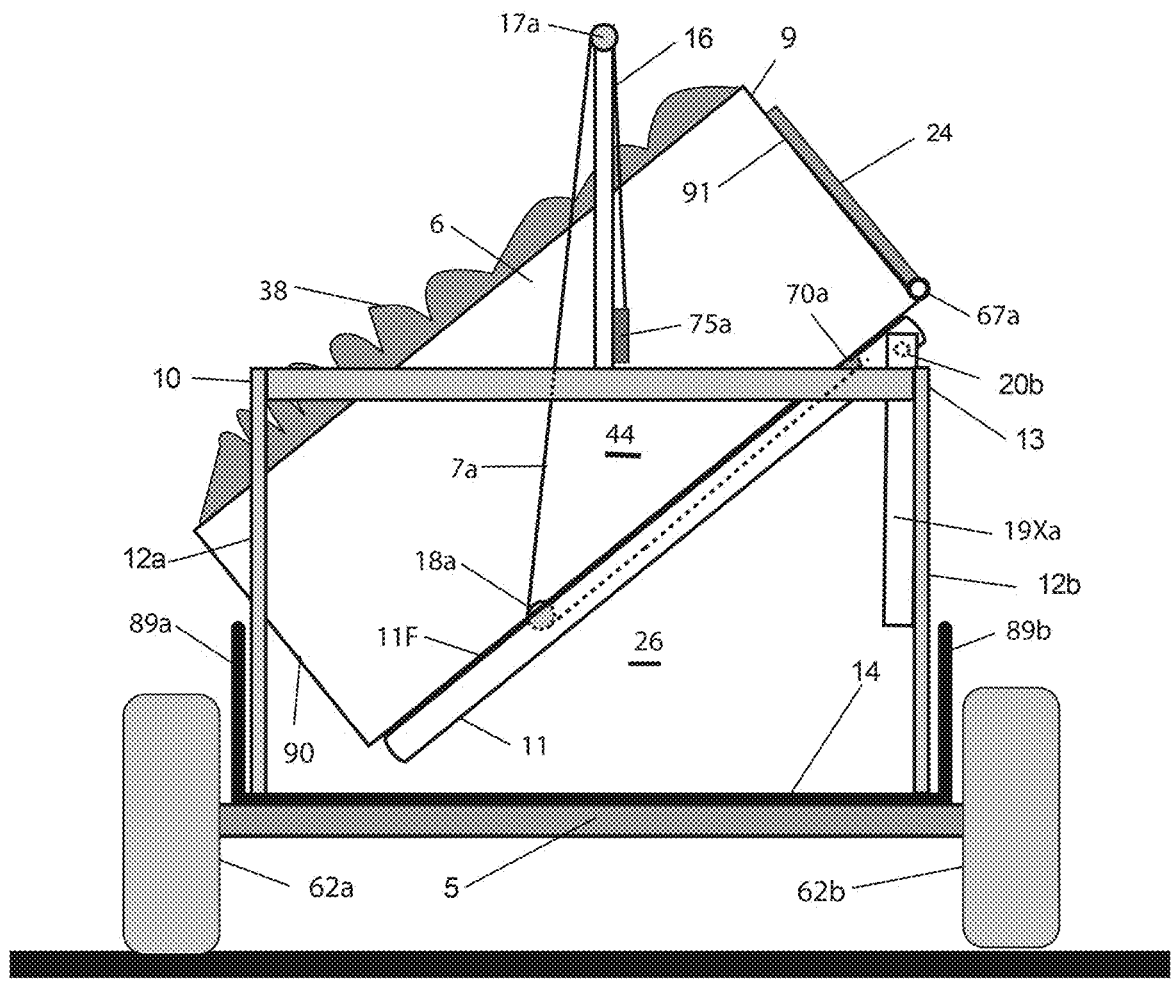
FIG. 3 is an end view of dump system mounted to the floor of a trailer with its bulk container pivoted downward at about a negative 45° angle prior to filling.
Figure 4:
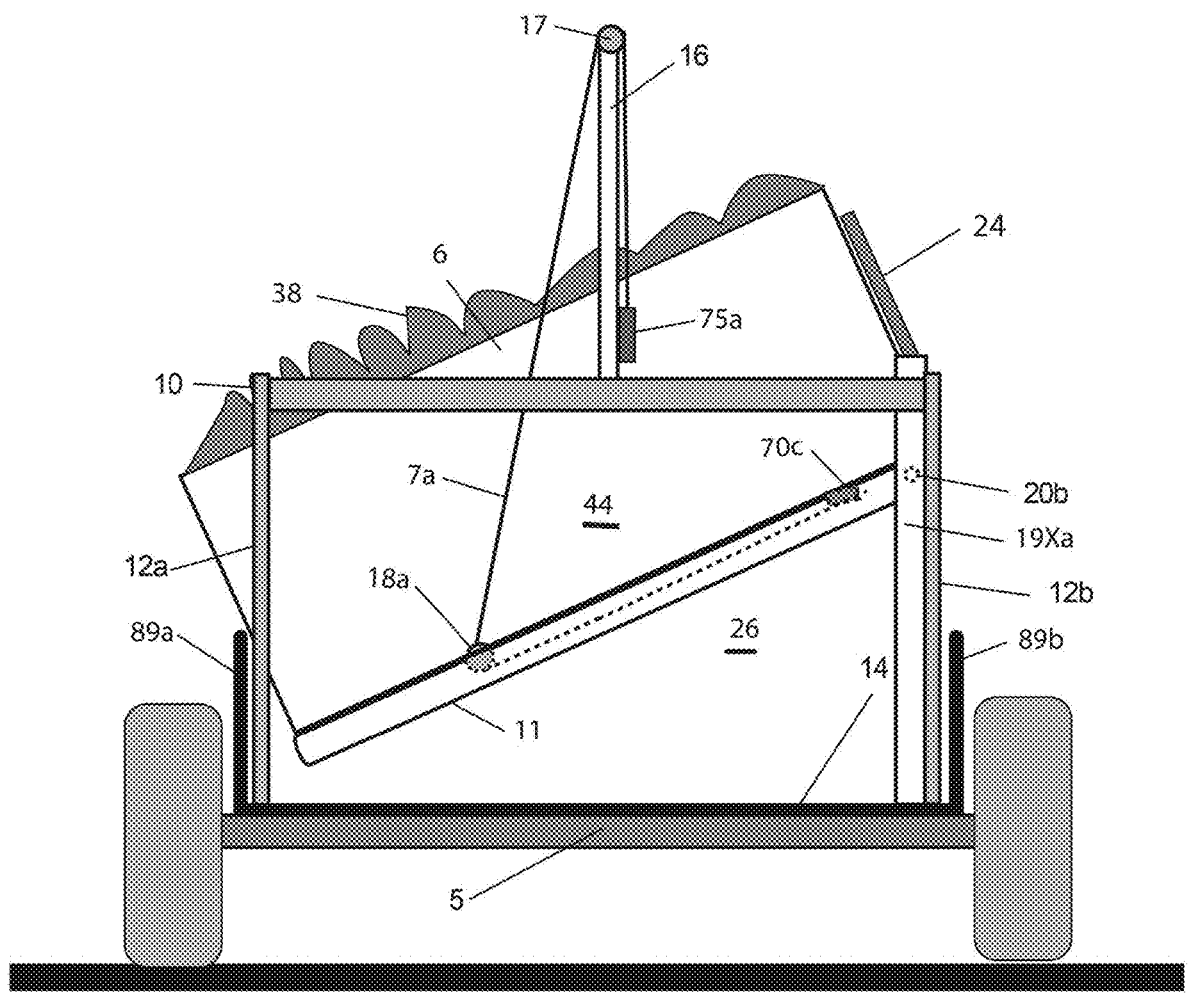
FIG. 4 is an end view of dump system mounted to the floor of a trailer with the front gate section of the bulk container lowered while the back wall of the bulk container remains angled downward and in close proximity too trailer floor.
Figure 5:
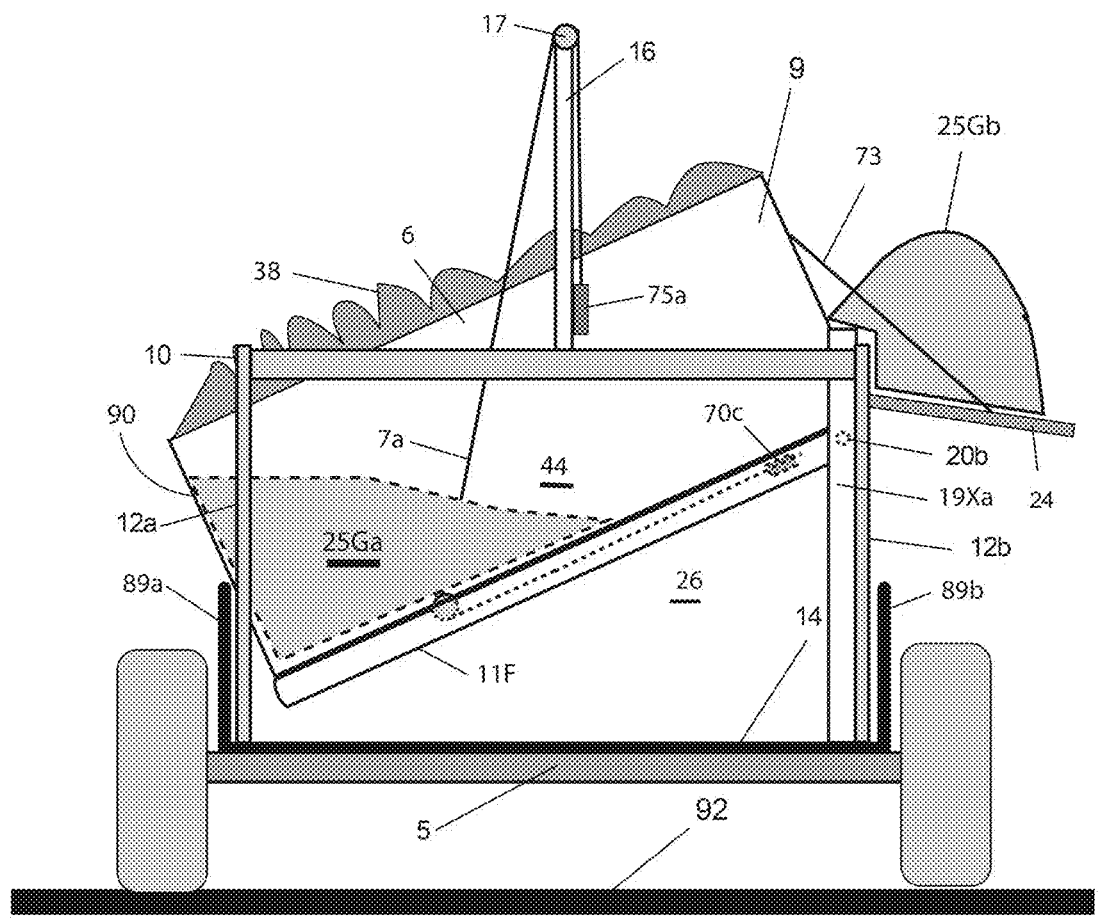
FIG. 5 is an end view of dump system mounted to trailer floor with the front gate opened to receive more grass clippings while the bulk container is partially filled.
Figure 6:
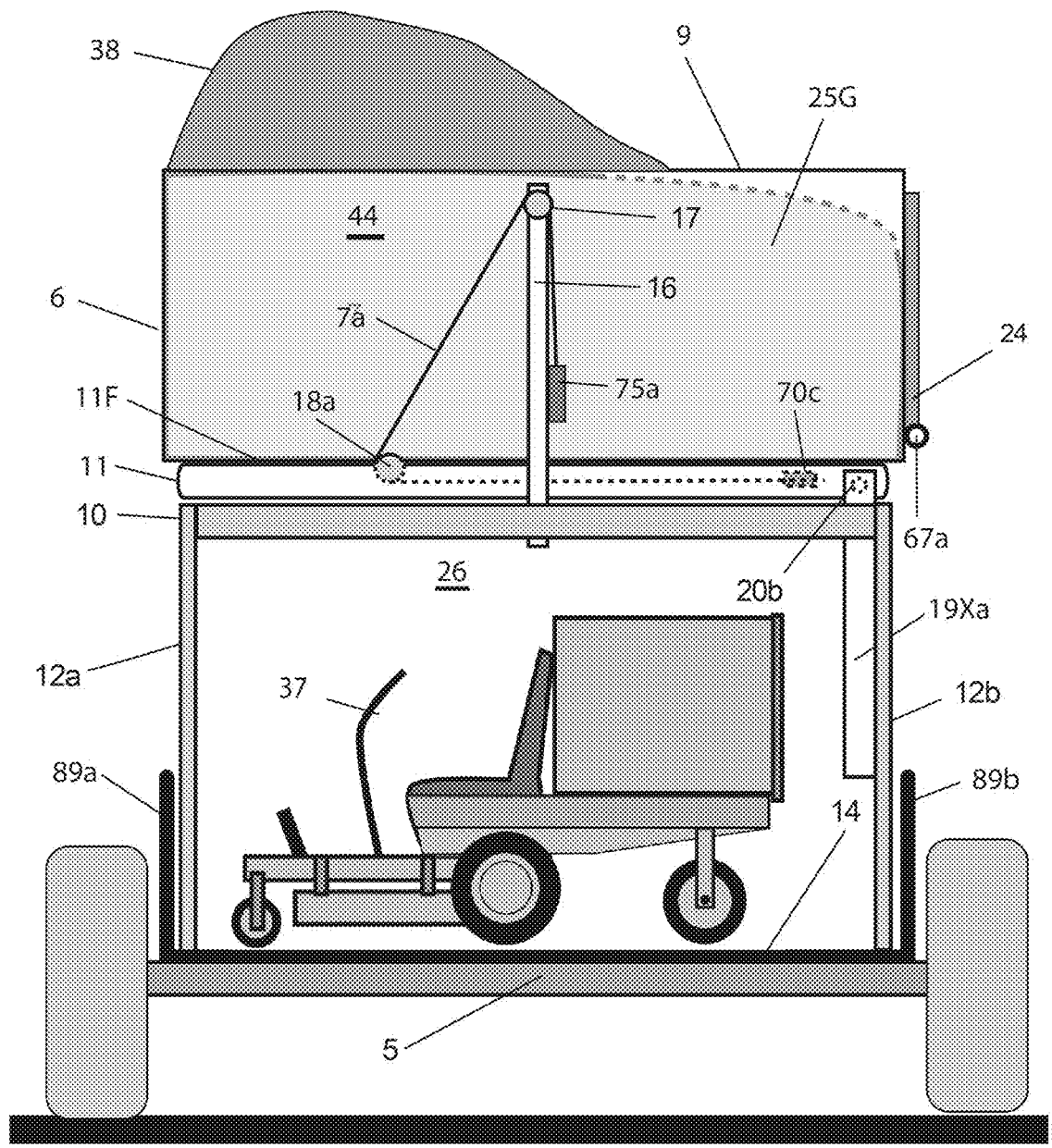
FIG. 6 is an end view of dump system with bulk container filled with grass clippings and raised back to its horizontal position for transport with lawnmower stowed underneath.
Figure 7:
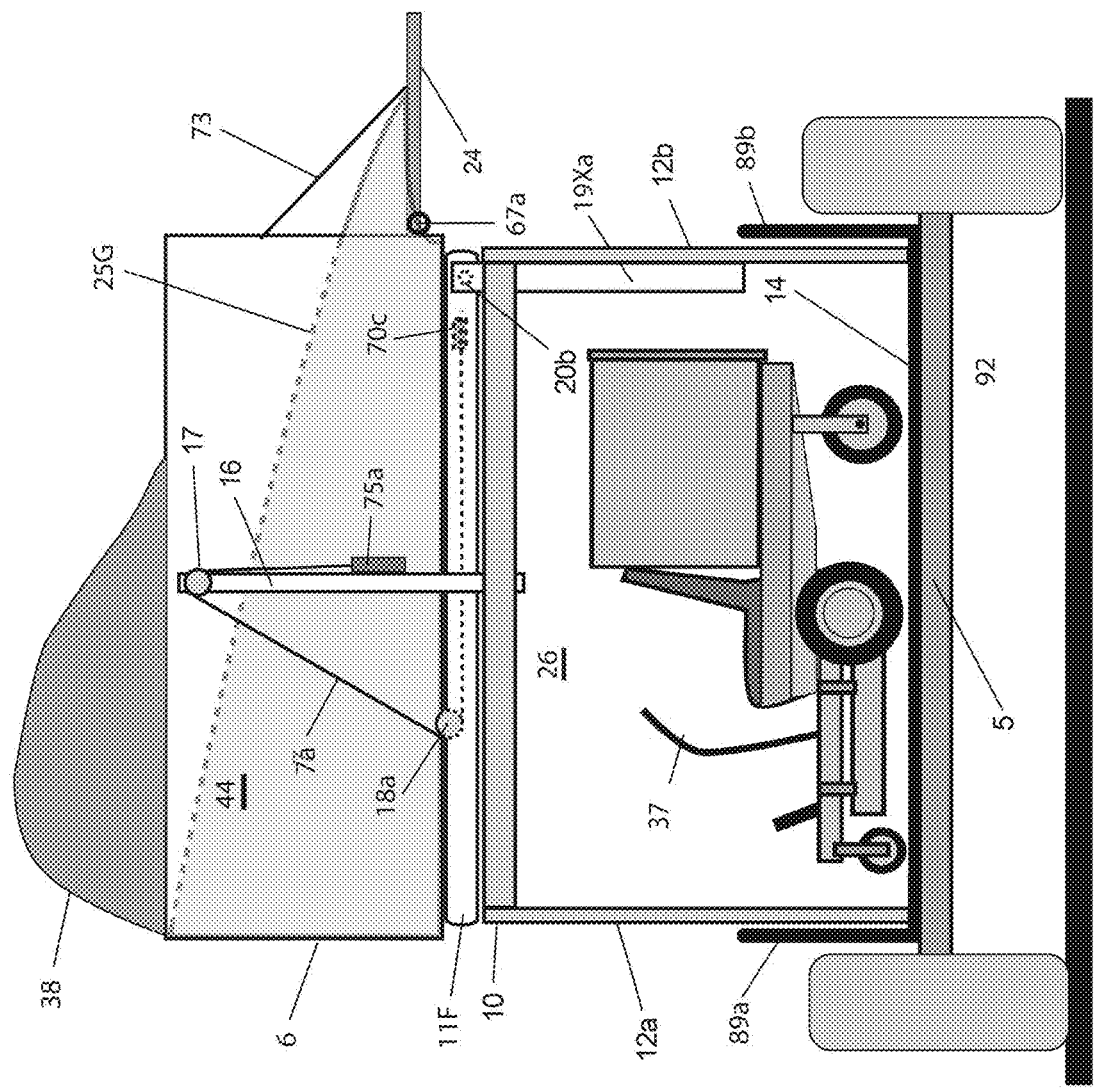
FIG. 7 is an end view of dump system mounted on trailer with lawnmower stowed beneath with front gate of filled bulk container open to start the emptying process.
Figure 8:
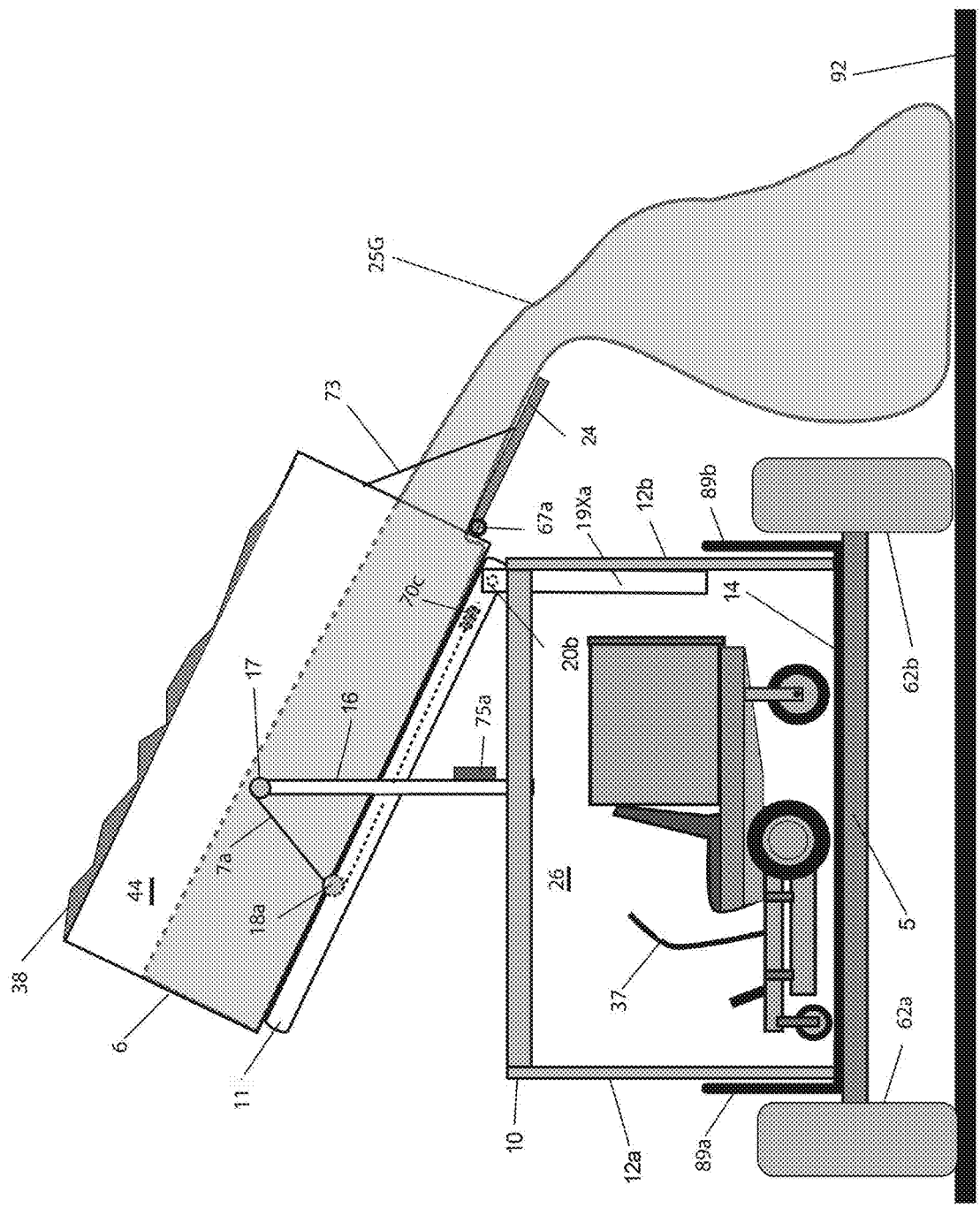
FIG. 8 is an end view of dump container mounted to trailer floor in the process of emptying grass clippings as bulk container is inclined via cable system to an angle of about 30°.
Figure 9:
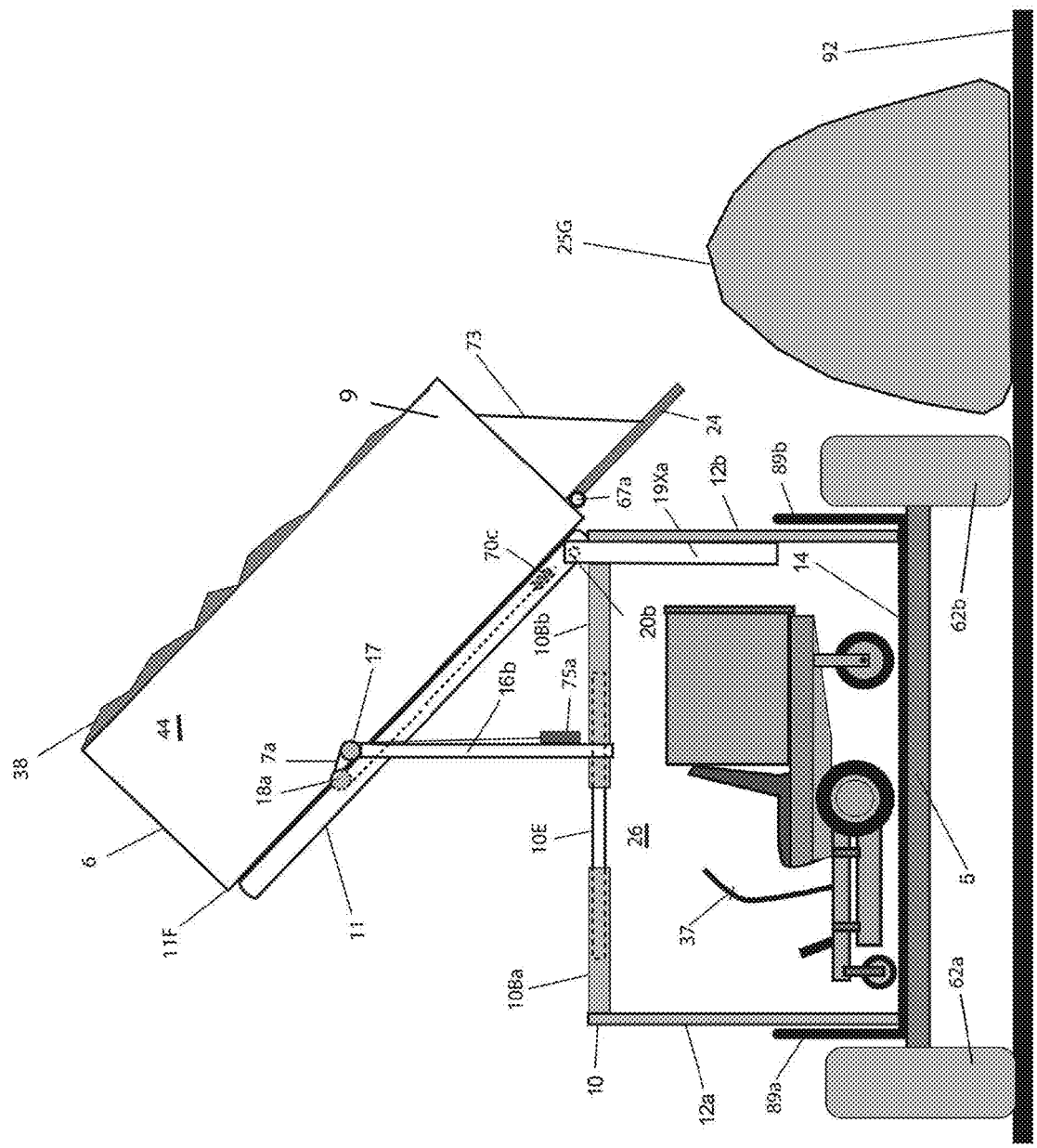
FIG. 9 is an end view of dump system mounted to trailer floor with bulk container emptied as it transitions to complete the side discharge dumping cycle to about a 650 angle.

FIGS. 3, 4, 5, 6, 7, 8, and 9 are end views of dump system 9 in various modes of operation on the trailer 5 to load, store, transport and then dump a load of grass clippings 25G and/or dry and/or wet materials. In FIG. 3, mower storage area 26 is left open for storing mowers and other lawn equipment to and from a job site as well as leaving space for the lifting frame 11 to slope downward for loading the dump frame container 44. Base legs 12a, 12b and 12c and 12d (FIG. 10) are adjustable so base frame 10 can be adjusted up or down. Base legs 12a to 12d can be fixed to trailer floor 14 and/or trailer rails 89a and 89b. While gate 24 and axle stub 20b (axle stub 20a shown in FIG. 10) remain at a fixed elevation and secured to base frame 10 via axle bracket 19Xa, dump frame 11 is allowed to form a negative angle of approximately 45 degrees from horizontal to allow bulk materials such as the grass clippings 25G to slide easily down dump frame floor 11F from gate 24 to rear wall 90 of the dump frame container 44. By loading the dump frame container 44 through a gate opening 91 on the dump frame 11 angled back and downwards, bulk material such as grass clippings will easily slide and somewhat be thrown down the dump frame floor 11F and begin accumulating first against from the rear wall 90. As bulk material begins filling the back end of the dump frame container 44, it may also pile up above top of the dump frame container 44 while an expandable cover 38 creates extra storage volume above the dump frame container 44 to increase storage capacity. Also, while compaction of grass clippings 25G and/or other materials may occur and cause flow problems, the grass clippings 25G last to be loaded with be first to be discharged to improve flow during the dumping sequence. In FIG. 4, cable 80 is extended downward from hydraulic cylinder 76 (FIG. 10) to allow the gate 24 to be opened at a lower level to the ground 92 for easier loading, requiring less lifting of the grass clippings 25G. In FIG. 5, the front end of the lift frame 11 has been lowered via operating front lift hydraulic cylinder 76 (FIG. 10) to lower the axle stubs 20b and 20a (FIG. 10) within the axle brackets 19Xb and 19Xa (FIG. 24) causing gate 24 to be closer the ground 92. As shown, the dump frame container 44 has been partially loaded with the grass clippings 25Ga that have accumulated against the rear wall 90 of dump frame-container 44. As loading of the dump frame container 44 continues, the gate 24 has been lowered via the extension of a gate cable 73 from hydraulic cylinder 71 (FIG. 10) to act as a dumping platform for the grass clippings 25Gb to be placed on. The dump frame container 44, with an expandable cover 38 can be sized to handle a day or more worth of the grass clippings 25G. Prior to lifting and leveling the dump frame container 44 and the dump frame 11 for transport, the gate cable 73 is retracted via the hydraulic cylinder 71 which causes the grass clippings 25Gb on the gate 24 to be dumped and partially thrown towards the rear wall 90. In FIG. 6, the dump frame 11 and dump frame container 44 have been lifted to their transport position while also providing the mower storage area 26 space underneath for transporting lawn mowers, supplies and other equipment As shown, dump system 9 on trailer 5 does not take up any usable trailer floor space. In FIG. 7, the dump frame container 23 is almost full of the grass clippings resulting from a full day of mowing and other yard work. Once trailer 5 arrives at a dump site and/or transfer station for emptying the dump frame container 44, which is loaded with about 1,200 pounds of the grass clippings 25G, the gate 24 is opened to a more horizontal position by extending the cable 73 from the hydraulic cylinder 71 (FIG. 10). The gate 24 provides an extension to the dump frame floor 11F so that the grass clippings 25G are deposited on the ground 92 away from and not directly on a wheel 62b. In FIG. 8, the hydraulic cylinder 64 (FIG. 10) retracts, pulling the cable 7a to tilt/dump frame container 44 container 44 to about 30 degree angle, causing the grass clippings 25G to begin flowing out of dump frame container 44 onto the gate 24 to the ground 92. In FIG. 9, the dump container 44 is shown as being empty of the grass clippings 25G after the dump frame floor 11F reaches a dumping angle of approximately 45 degrees or more and/or the grass clippings 25G angle of repose. The angle of repose of the grass clippings 25G can vary according to the moisture content, compaction, storage time, etc. . . . The dump frame 11 has an adjustable, maximum dump angle of up to 90 degrees. The cable lift posts 16b and 16a (FIG. 1) may be moved laterally, lowered and/or raised to accommodate the maximum dump angle of the dump frame container 44. The emptying/dumping sequence of dump system 9 can be operated without detaching the trailer 5 from a truck as well as leaving the lawn mower 37 stowed on the trailer floor 14. FIG. 10 is a top view of the hydraulic cylinders 64, 76 and 71 installed within the lift frame assembly 6. The hydraulic cylinder 64 is connected to a hydraulic pump 84 via a set of hydraulic hoses 81a and 81b and controlled by activating a hydraulic outflow valve 82a for lifting or a hydraulic return valve 83a The hydraulic cylinder 76 is connected to the hydraulic pump 84 via the hydraulic hoses 81c and 81d and controlled by activating the outflow valve 82b or the hydraulic return valve 83b. The hydraulic cylinder 71 is connected to the hydraulic pump 84 via the hydraulic hoses 81*e* and 81*f* and controlled by activating the outflow valve 83*b* and the return valve 83. Because the cable and pulley system 101 reduces the load to be moved, other power components such as air cylinders, linear actuators, winches and rotary actuators may be used in place of the hydraulic cylinders 64, 76 and 71. Other sensing and switching devices may be incorporated into the cable and pulley system 101 such as a scale, a read out display, a load cell, a set of limit switches, a pressure control regulator, power inverters, air tanks and valves, etc . . . may also be used in place of hydraulics.

Figure 11:
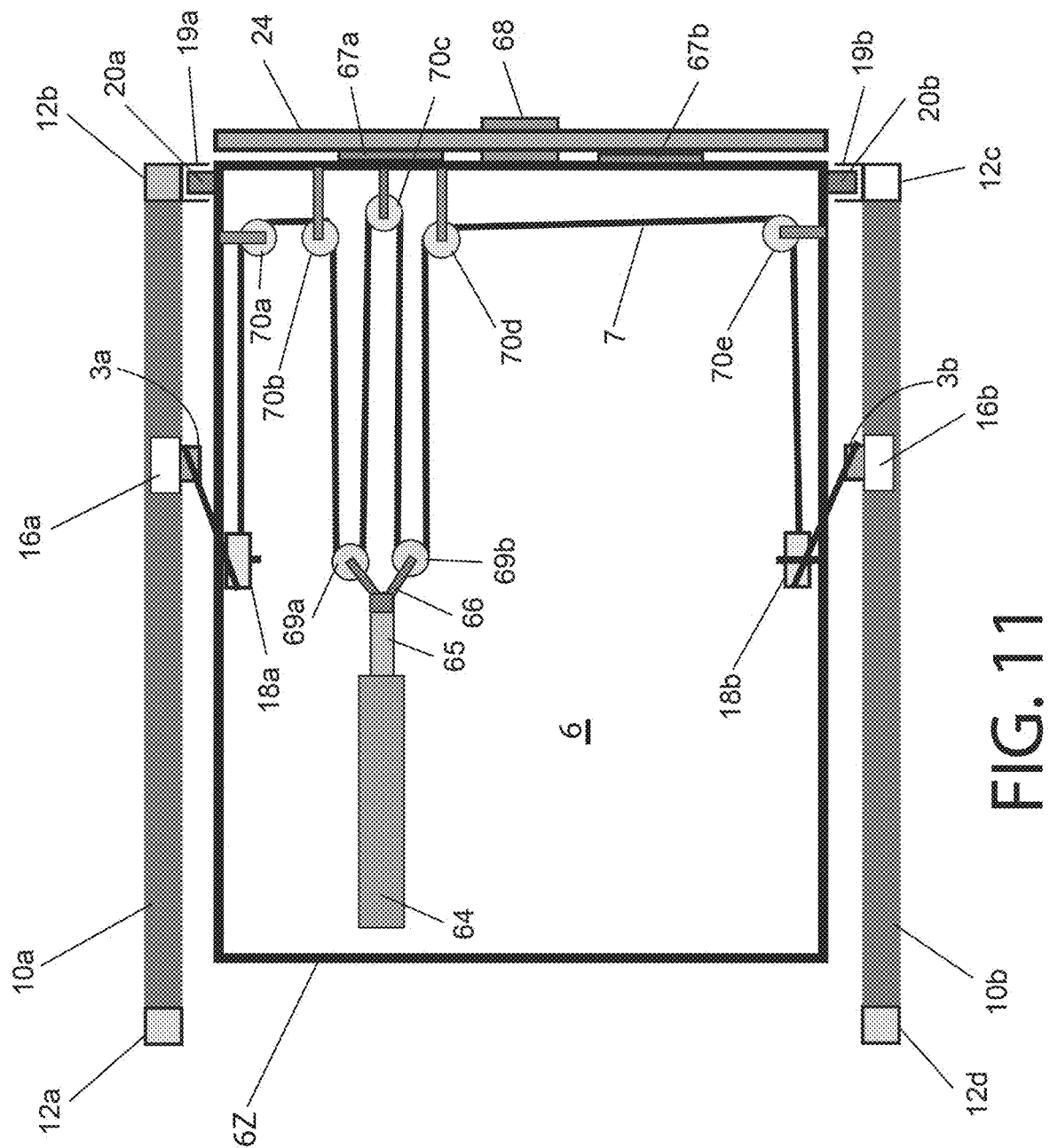
FIG. 11 is a top view of lift frame hydraulic cylinder retracted fully, cable and block and tackle type pulley system causing the bulk container and lift frame to angle upward to a maximum dump angle of about 65°.
Figure 12:
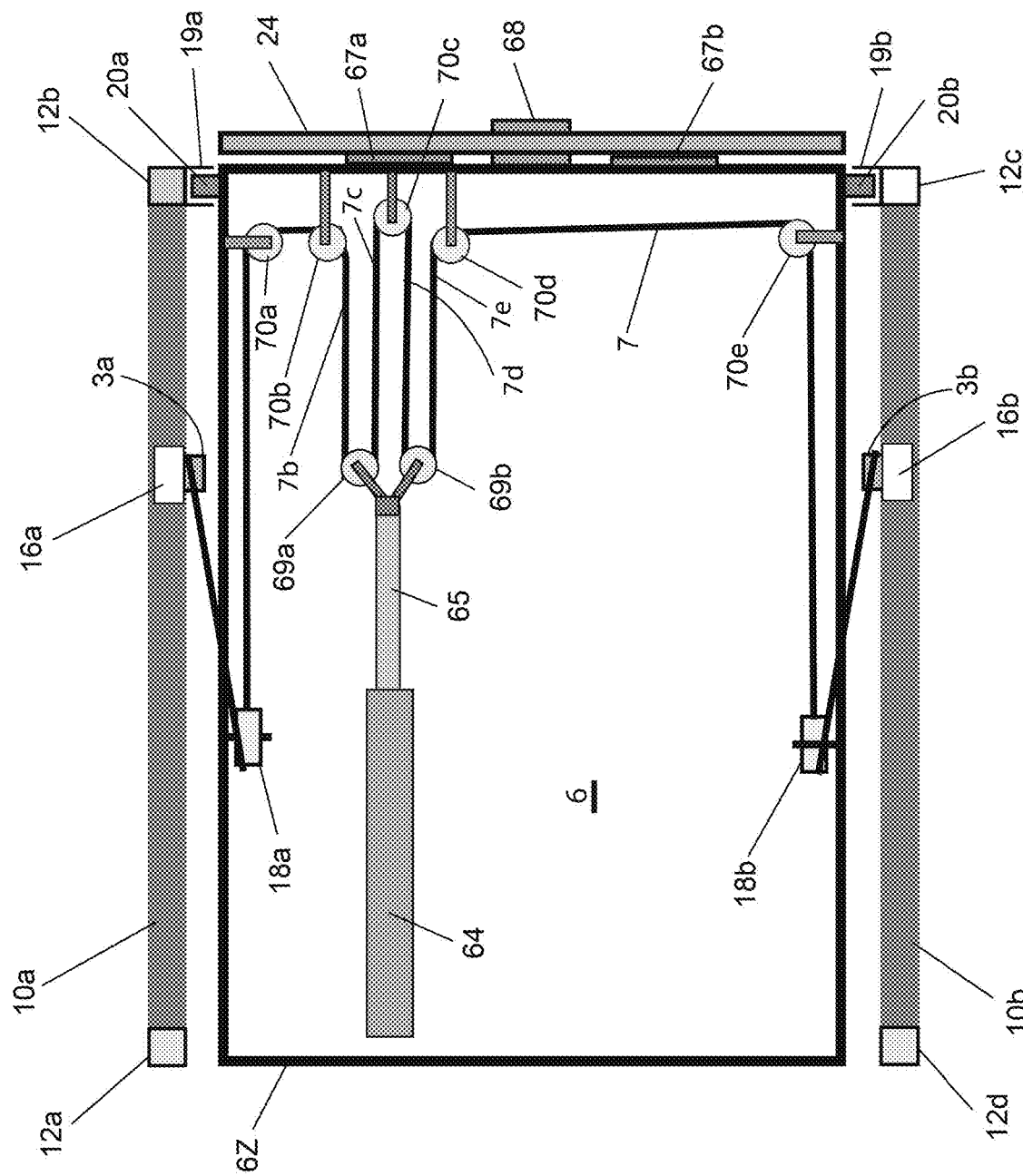
FIG. 12 is a top view of lift frame hydraulic cylinder extended about half way which causes lift frame and bulk container to rest in a horizontal position for transport.
Figure 13:
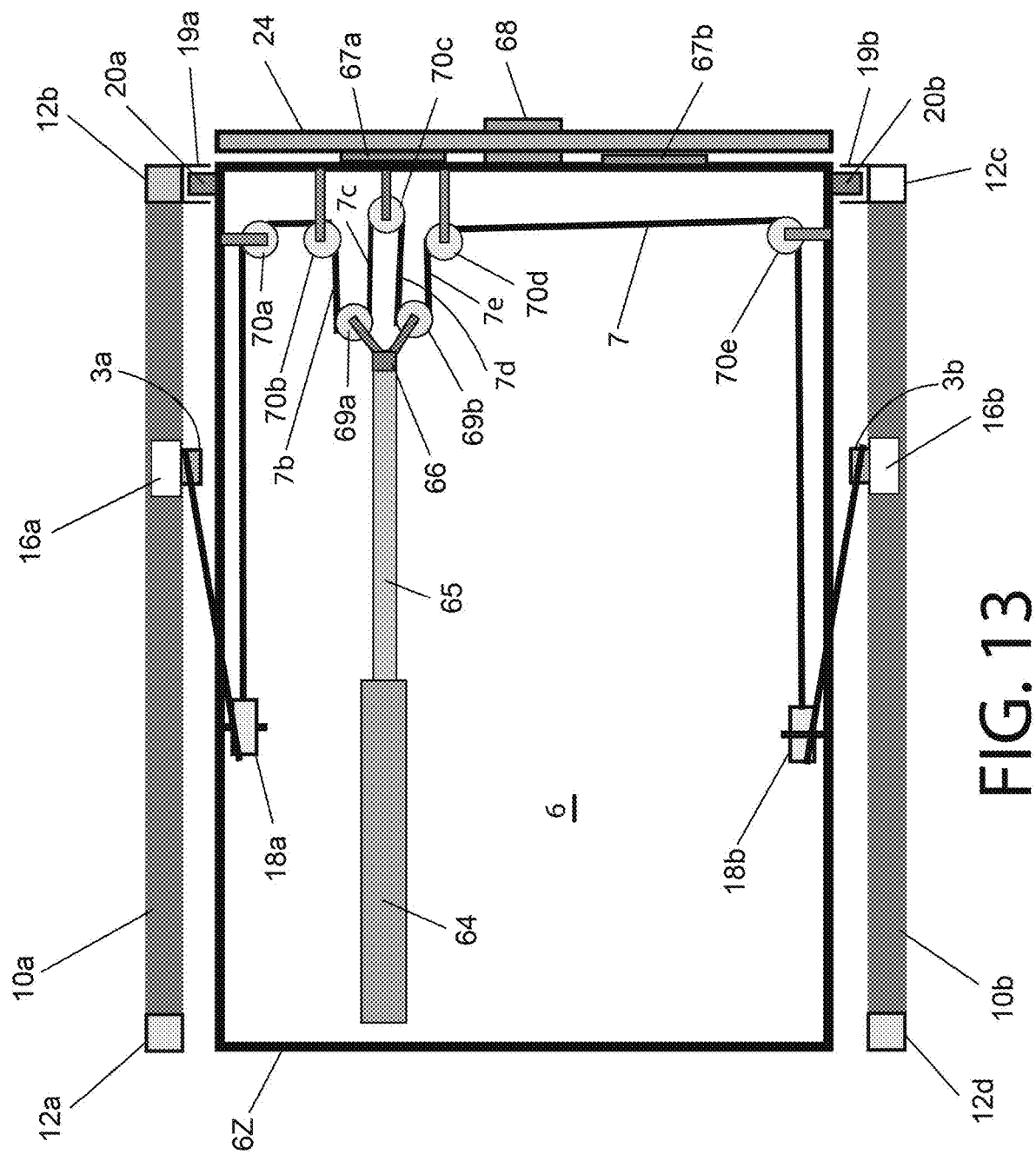
FIG. 13 is a top view of the lift frame hydraulic cylinder extended completely which causes lift frame and bulk container to pivot downwards to about a −45° angle for filling.

FIGS. 11, 12 and 13 are top views of the lift frame assembly 6 positioned between base frame 10*a* and base frame 10*b* with the hydraulic cylinder 64 installed. In FIG. 11, so that the lift platform assembly 6 can be raised, lowered and angled freely, the axle brackets 19*a* and 19*b* are fixed to the base frame 10 and axle stubs 20*a* and 20*b* can move freely within axle brackets 19*a* and 19*b* to extend from top of base frame 10*a* and 10*b* to the trailer floor 14 (FIG. 9). The hydraulic cylinder 64 is connected to the lift frame assembly 6 via a bracket. In this configuration, a cylinder rod 65 is fully extended from the hydraulic cylinder 64 so that the lift cable 7 is fully extended to allow the lift frame assembly end 6Z to pivot downward towards the ground 92 (FIG. 9) which position can be used for filling. As shown, a set of cable anchors 3*a* and 3*b* are equipped to the ends of the lift cable 7 while the cable 7 is secured to pulley post 16*a* via cable anchor 3*a* while the other end of lift cable 7 is secured to the pulley post 16*b* via the cable anchor 3*b*. The cable 7 is fixed to the cable anchor 3*a*, it is further routed through a guide pulley 18*a*, a set of fixed pulley assemblies 70*a* and 70*b*, then around a rod pulley 69*a*, then to a fixed pulley 70*c*, then around a rod pulley 69*b* and then through a another set of fixed pulleys 70*d*, 70*e* and finally around the guide pulley 18*b* to end at the cable anchor 3*b* on the pulley post 16*b*. Any movement of the cylinder rod 65 will result in either an up or down movement of the end of lift frame end 6Z. Since the stroke length of the cylinder rod 65 is only about 20 inches in length and the movement of lift frame assembly 6Z requires about 80 inches of length for the lift frame 11 to move from a negative 45 degree angle from horizontal to a positive 75 degree angle for dumping, the rod pulleys 69*a* and 69*b*, in conjunction with the fixed pulley assemblies 70*b* and 70*d*, functions similar to a block and tackle pulley arrangement. In FIG. 12, the cylinder rod 65 with rod pulleys 69*a* and 69*b* installed is retracted which will raise lift frame end 6Z by the change in distance from the length moved of lift cable 7*b*, 7*c*, 7*d* and 7*e*. As a result, if cylinder rod 65 is retracted about 10 inches, the length of the usable cable 7 change will be about 4×10 which is 40 inches. This 40" of retracted lift cable 7 will allow the lift frame assembly 6 to move upwards to a horizontal position which is the angle for transport In FIG. 13, the rod pulleys 69*a* and 69*b* are retracted further via the cylinder rod 65 so that more of the lift cable 7 is collected such that lift cables 7*b*, 7*c*, 7*d* and 7*e* has quadrupled from 30 inches to 120 inches. The block and tackle arrangement created by having the fixed pulleys 70*b*, 70*c* and 70*d* work in conjunction with the moving pulleys 69*a* and 69*b* not only create a mechanical advantage resulting in a lighter load for the hydraulic cylinder 64 to handle (allowing for a smaller bore cylinder or less powerful linear actuator), the 1 inch to 4 inch ratio provides the 120 inches of the cable 7 length required to provide each side of the lift frame 11 with 60 inches of the cable 7 for the maximum up and down movement of the lift frame assembly 6. In this configuration, the lift frame assembly 6 now has a positive dump angle in the range of about 45 to 90 degrees. During the operation of the lift frame assembly 6, which can be angled according to the desired function, the axle stubs 20*a* and 20*b* remain stable within the axle bracket 20*a* and 20*b*. Also shown are the gate hinges 67*a* and 67*b* which allow the gate 24 to open and close for filling and emptying. A gate spring 68 helps the gate 24 open easily since it opened via gravity. To provide an advanced level of safety, the hydraulic cylinders 64, 71 (FIG. 10) and 76 (FIG. 10) are only used for lifting functions with force. Any time one of the components of the dump system 9 needs to be lowered, gravity is relied upon so that any downward motion caused by the hydraulic cylinder 64 and can't push down under power and cause damage or injury.

Figure 14:
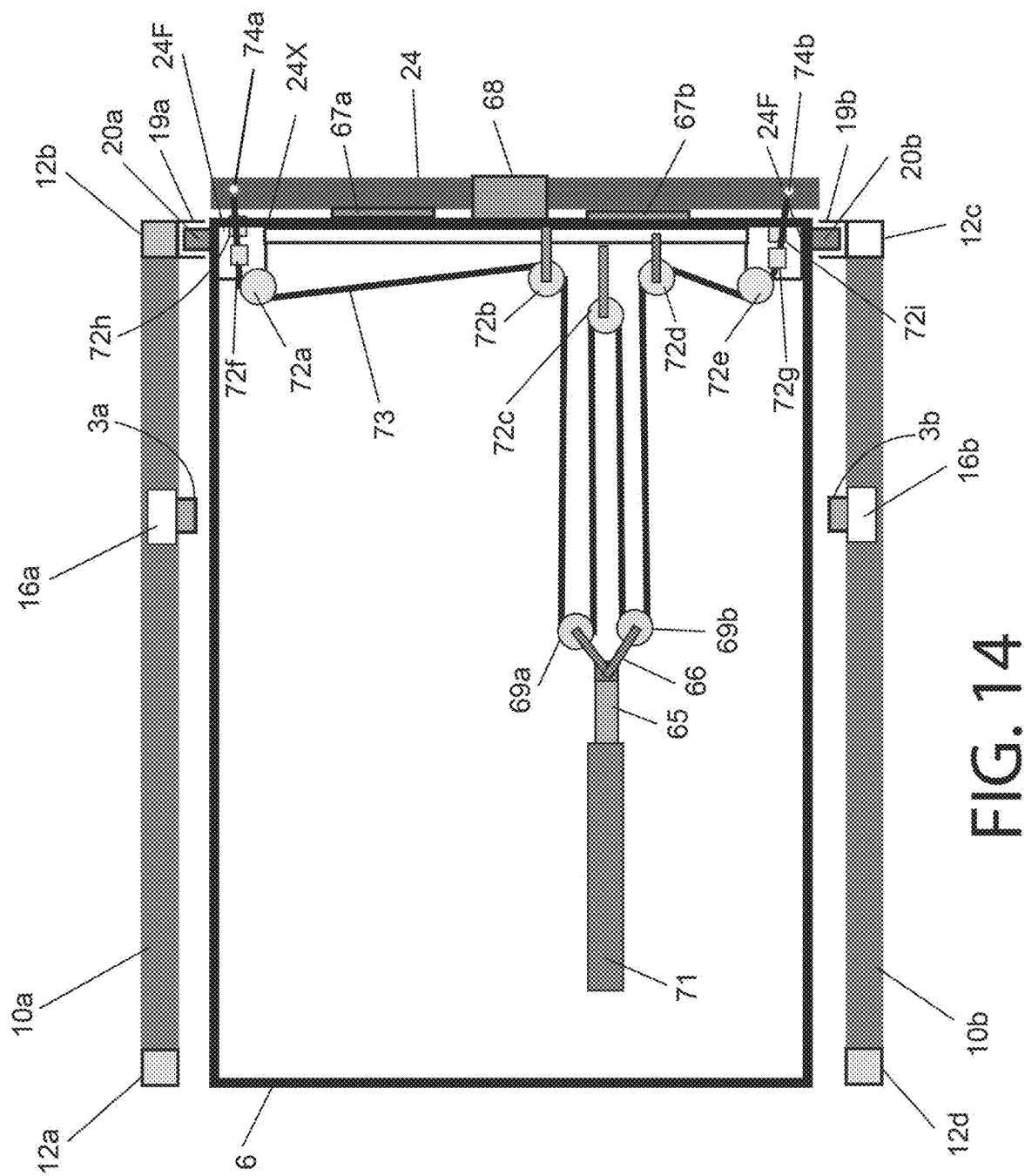
FIG. 14 is a top view of the gate hydraulic cylinder retracted completely using a cable and pulley arrangement for raising and keeping gate closed.
Figure 15:
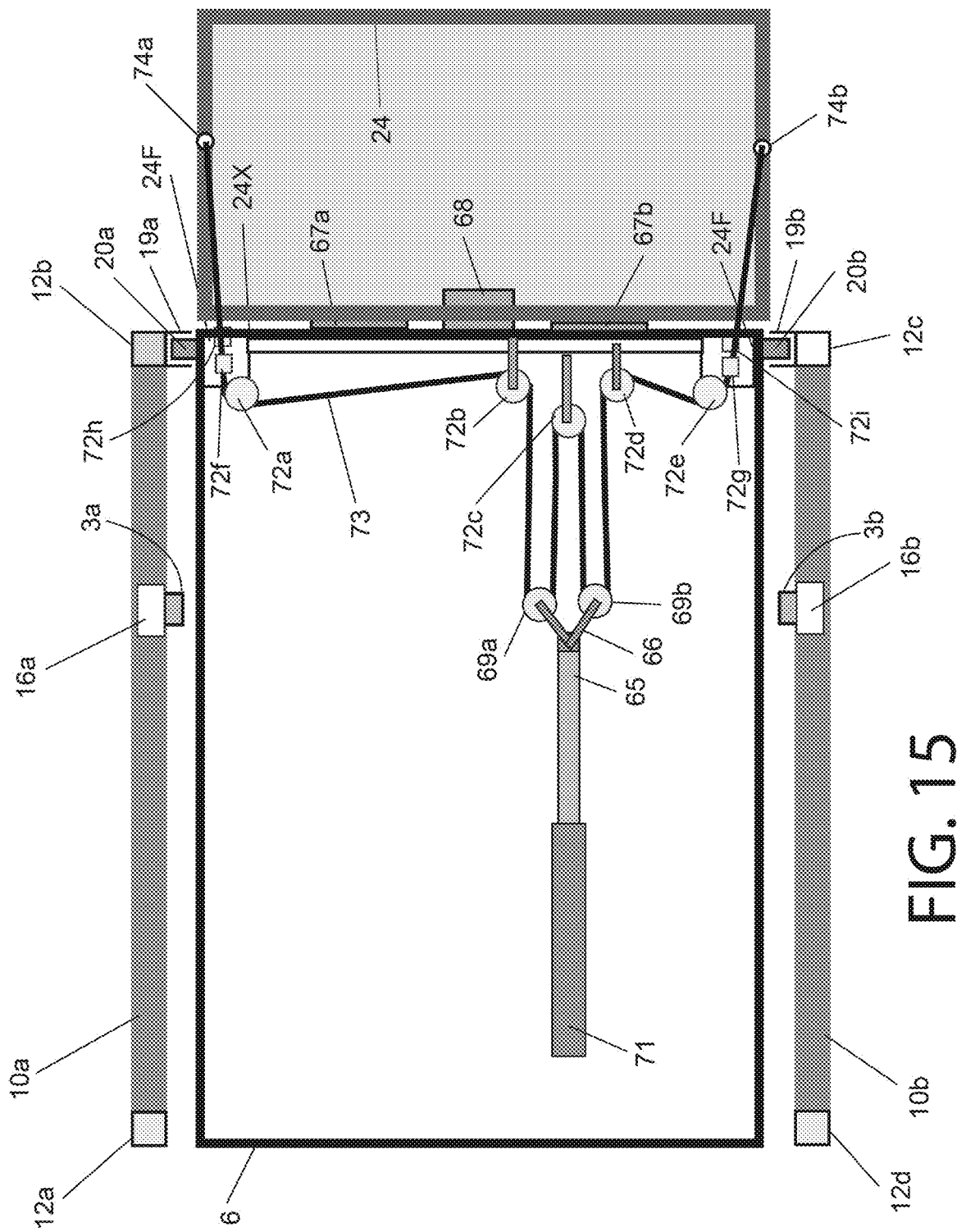
FIG. 15 is a top view of the gate hydraulic cylinder extended using a cable and pulley arrangement for lowering and maintaining gate in an open position for filling.

FIGS. 14 and 15 are top views of the lift frame assembly 6 equipped with the hydraulic cylinder 71 for opening and closing the gate 24. In FIG. 14, the gate 24 is closed and in a vertical position because the gate cable 73 is taut. As shown, a cylinder rod 65 is retracted fully so that with one end of the gate cable 73 is secured to the gate 24 via a cable anchor 74*a* while the other end is secured to the gate 24 via the cable anchor 74*b*. Notice how the use of the rod pulleys 69*a* and 69*b*, in conjunction with a set of gate pulleys 72*b*, 72*c* and 72*d*, create a type of block and tackle arrangement It is possible to use a single rod pulley 69 if the hydraulic cylinder 71 has a longer range of extension and/or retraction than the gate cable 73. Cable 73 is routed from cable anchor 74*a* on gate 24 over gate pulley 72*h* mounted on gate frame post 85*a* down through gate frame post 85*a* to gate pulley 72*f* and then is routed horizontally around gate pulleys 72*a* and 72*b*. As shown, the other end of gate cable 73 is secured to gate 24 via cable anchor 74*b*. The gate cable 73 runs from the cable anchor 74 over the gate pulley 72*i* down through a gate frame post 85*b* to a gate pulley 72*g* and then to a horizontal position. As the cylinder rod 65 moves in out from the hydraulic cylinder 71, the gate 24 may open and close. In this configuration, with the cylinder rod 65 fully retracted, the gate 24 is closed. In FIG. 15, the gate 24 is shown open and in a relatively horizontal position with the cylinder rod 65 fully extended.

Figure 16:
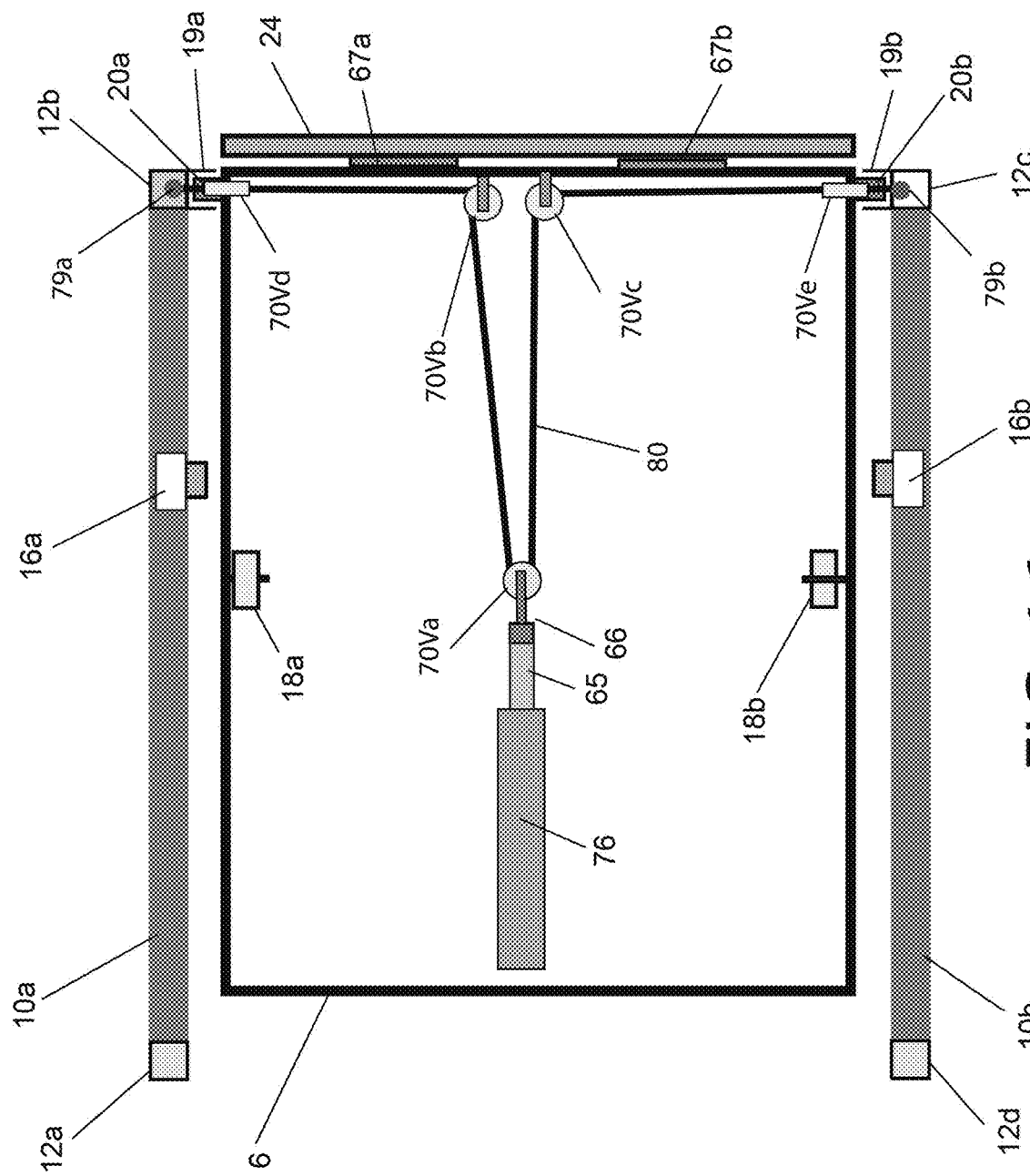
FIG. 16 is a top view of the gate elevation hydraulic cylinder completely retracted using a cable and pulley arrangement for raising the gate of bulk material container to its maximum height.
Figure 17:
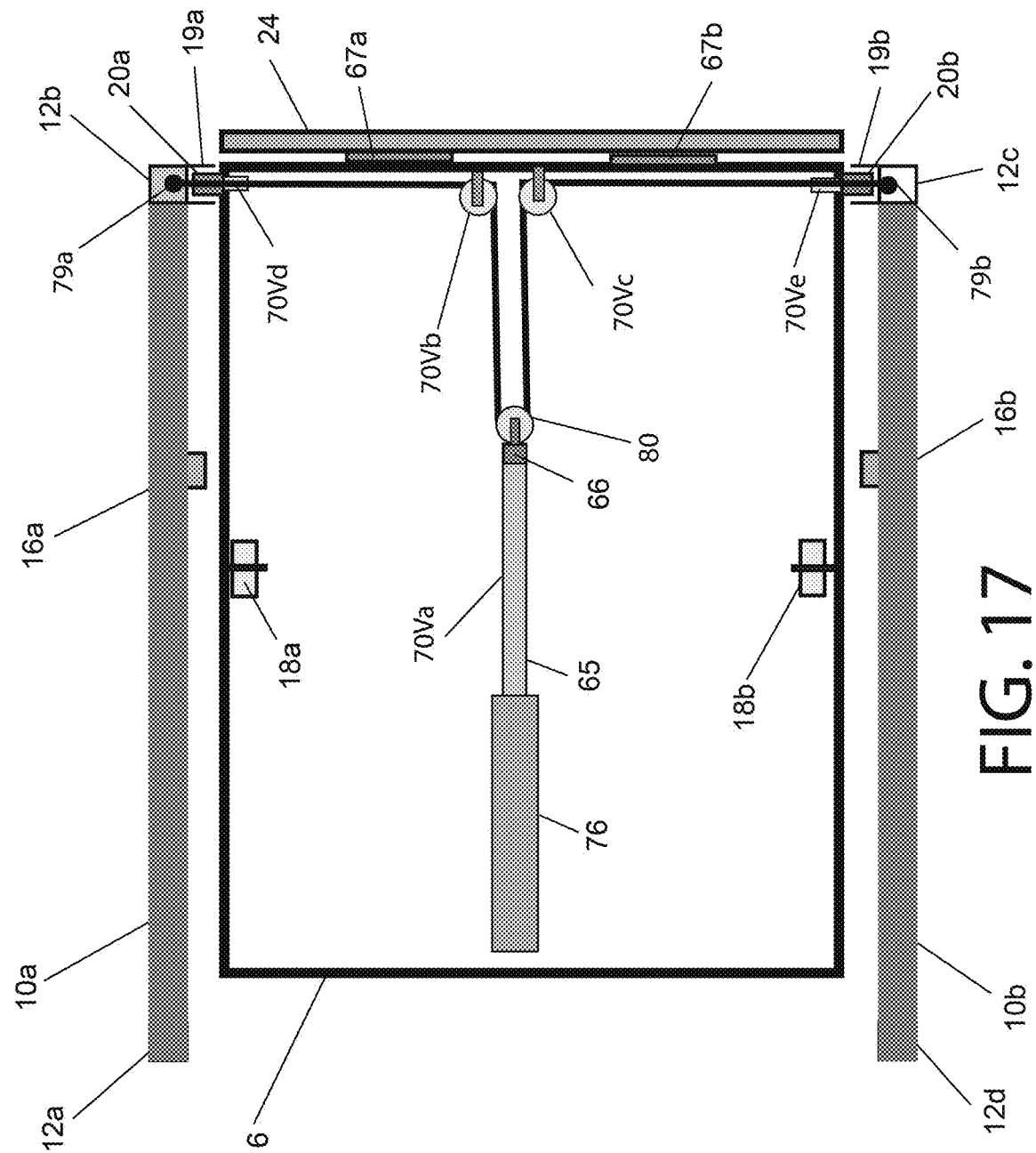
FIG. 17 is a top view of the gate elevation hydraulic cylinder extended using a cable and pulley arrangement to lower front end of bulk container with gate for easier loading by the operator because of a lower lifting height of grass clippings and/or other bulk materials.
Figure 18:
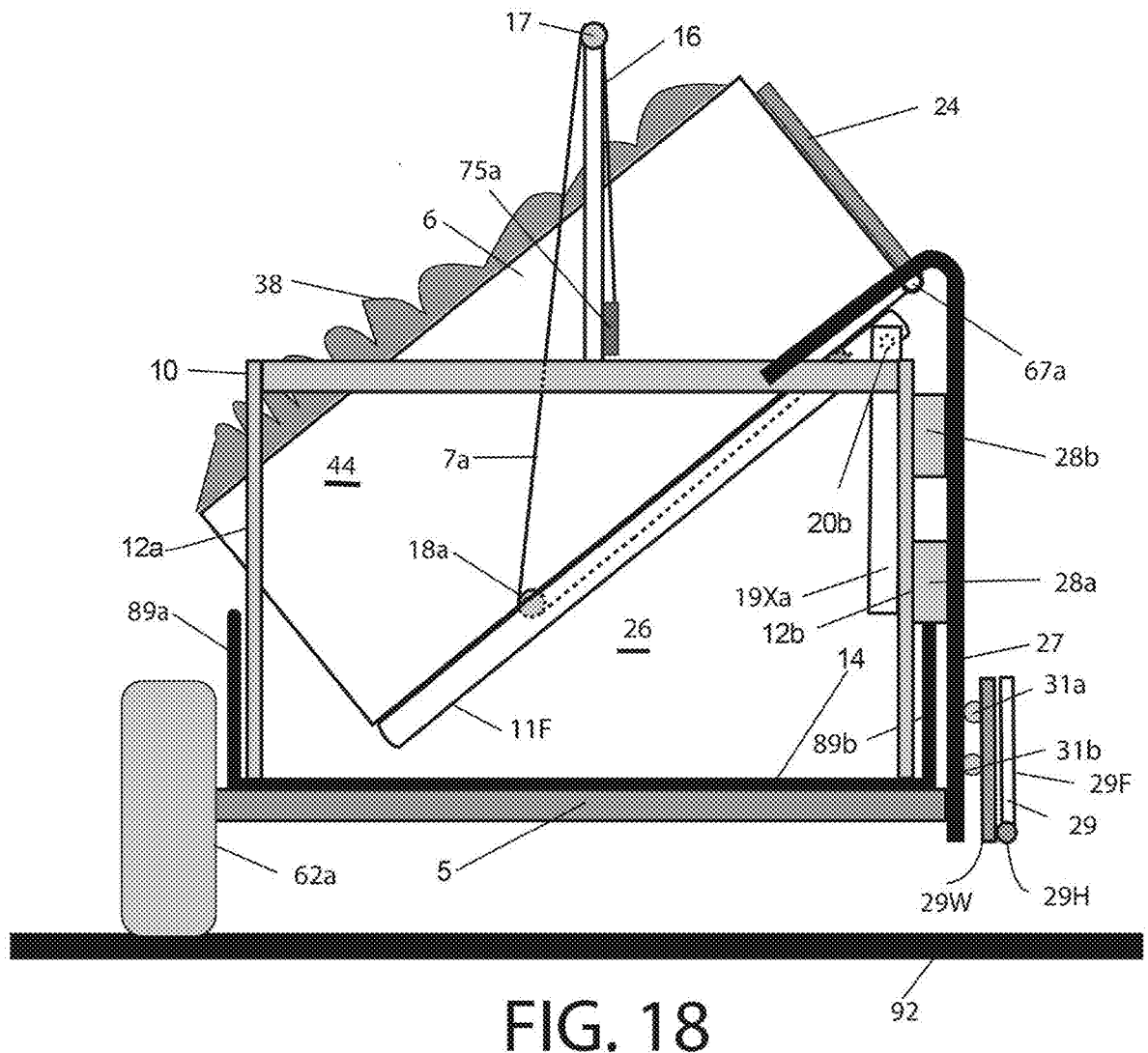

FIGS. 16 and 17 are top views of the lift frame assembly 6 equipped with the front lift hydraulic cylinder 76 to lower and raise the gate 24 end of the lift frame assembly 6 via front the front lift cable 80 via the fixed pulley assemblies 70V*a*, 70V*b*, 70V*c*, 70*vb* and 70*vd*. In FIG. 16, because the range of lifting the front end of the lift frame assembly 6 is small (10" to 18") and a relatively light load, a block and tackle pulley arrangement may not be required. In this configuration, an 8 inch long hydraulic cylinder 76 can be used with the vertical pulleys 70V*d* and 70*e*. With the front lift hydraulic cylinder 76 shown as fully retracted, the lift frame assembly 6 is at its maximum height In FIG. 17, the front lift hydraulic cylinder 76 is fully extended to allow the lift frame assembly 6 to be lowered as desired. Range of motion is about 18 inches for the length of the cylinder rod 65.

Figure 19:
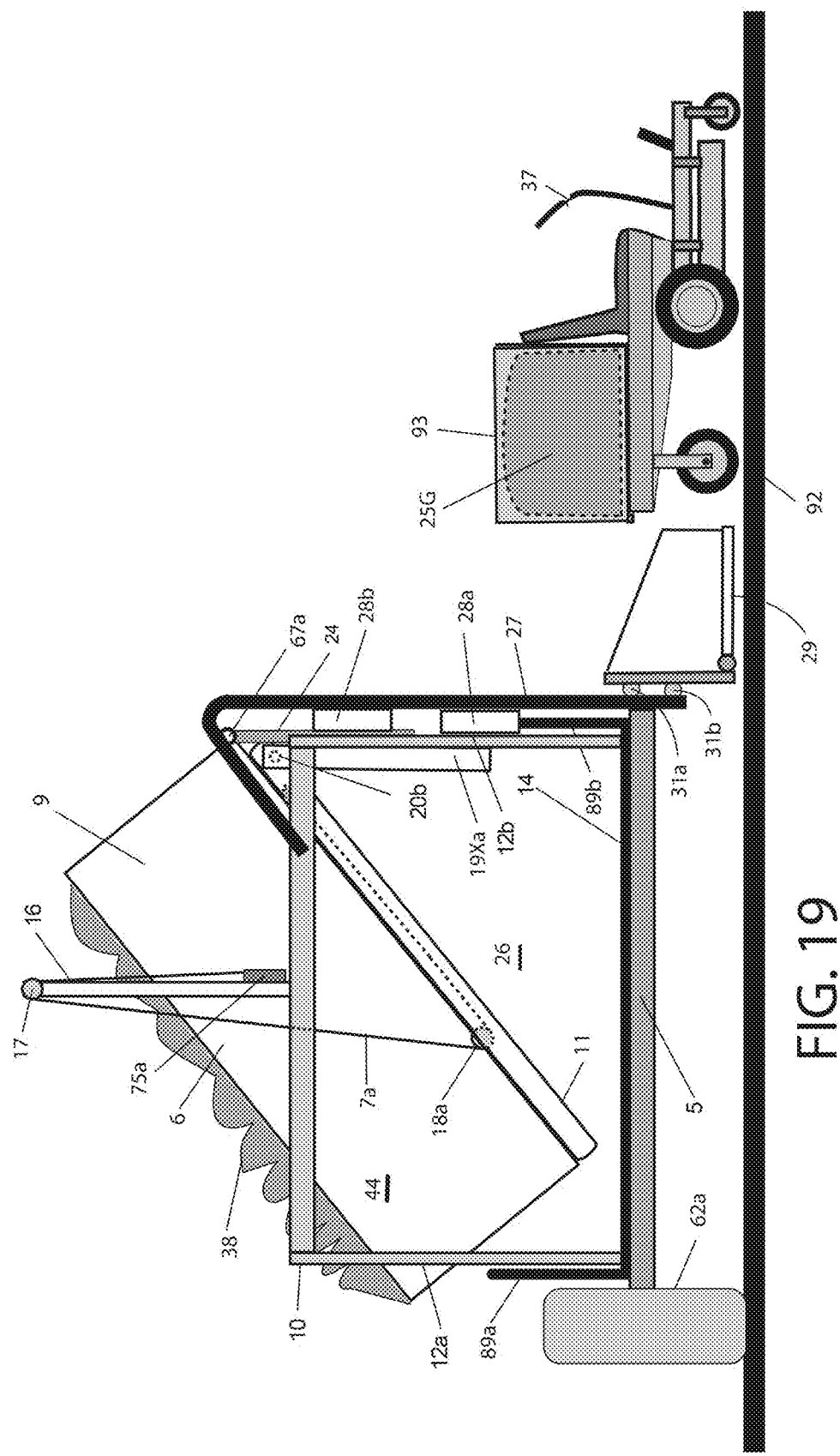
FIG. 19 is an end view of dump system with bulk container angled to about −45° for filling with lift container secured to tracks open and resting on ground ready to be filled with grass clippings from a commercial lawnmower.
Figure 20:
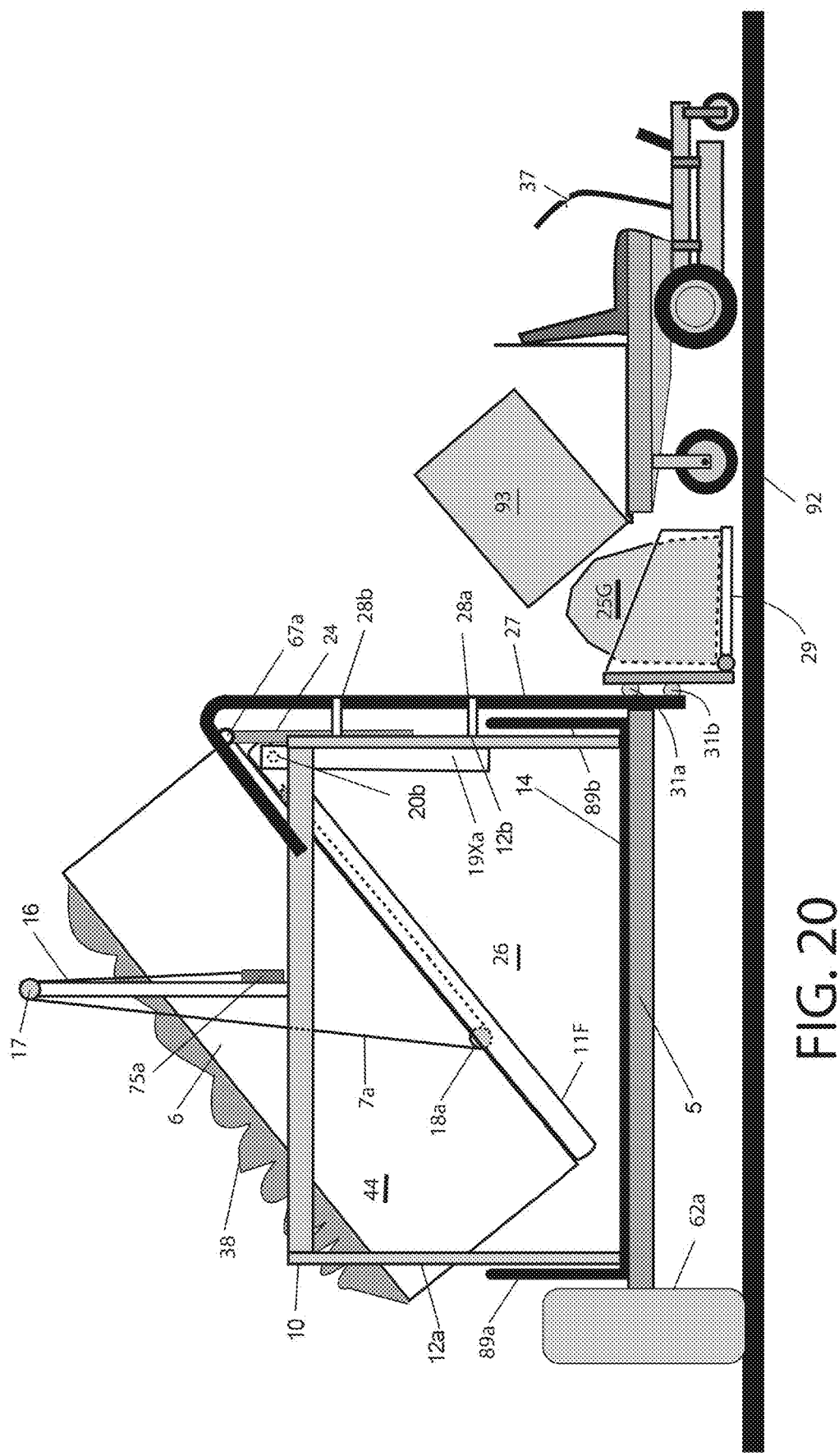
FIG. 20 is an end view of lawnmower dumping grass clippings into a lift container, requiring no manual lifting and exposure to ticks by an operator.
Figure 21:
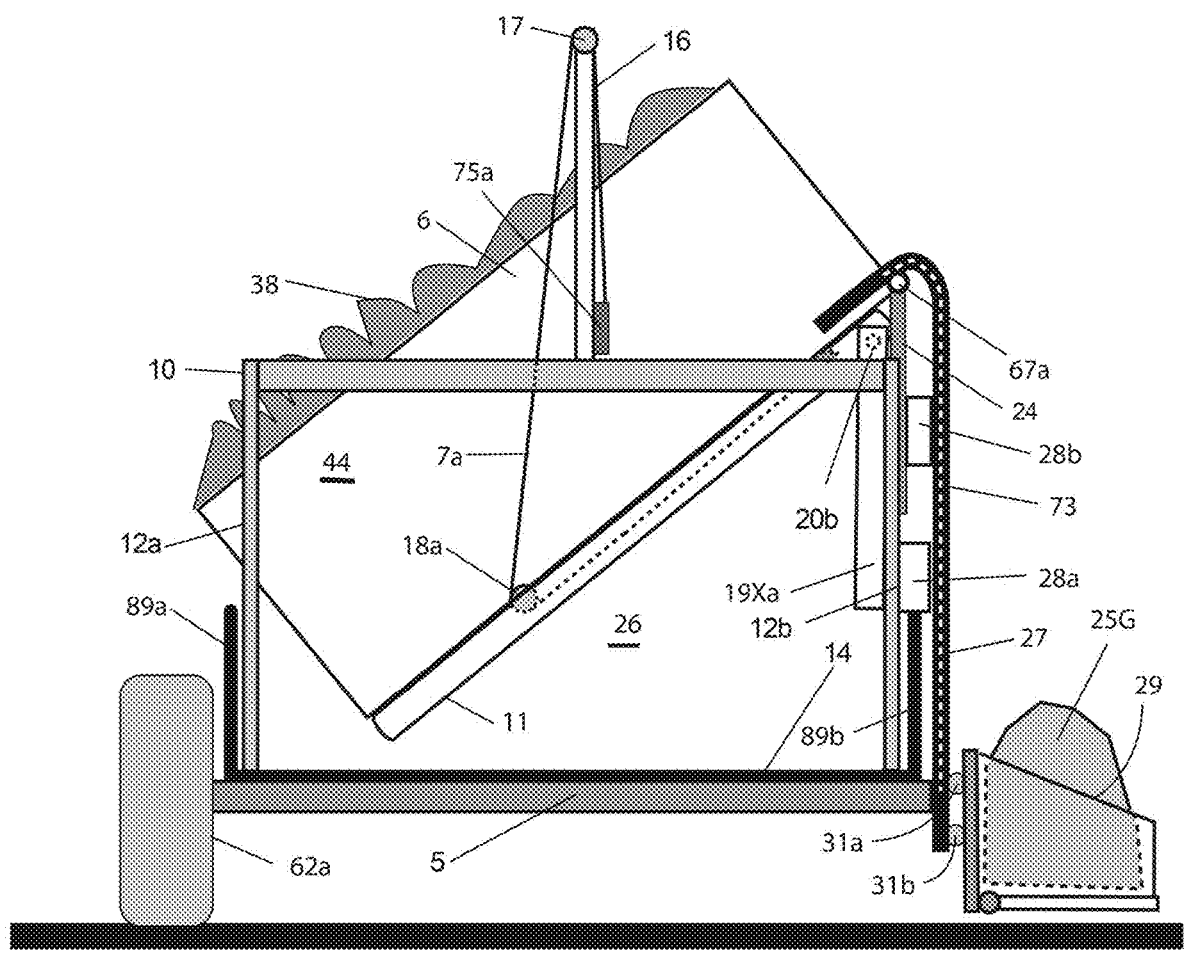
FIG. 21 is an end view of dump system secured to trailer floor with lift container filled with grass clippings ready for loading into the bulk container via the tracks as lawn mower returns to cut more grass.
Figure 22:
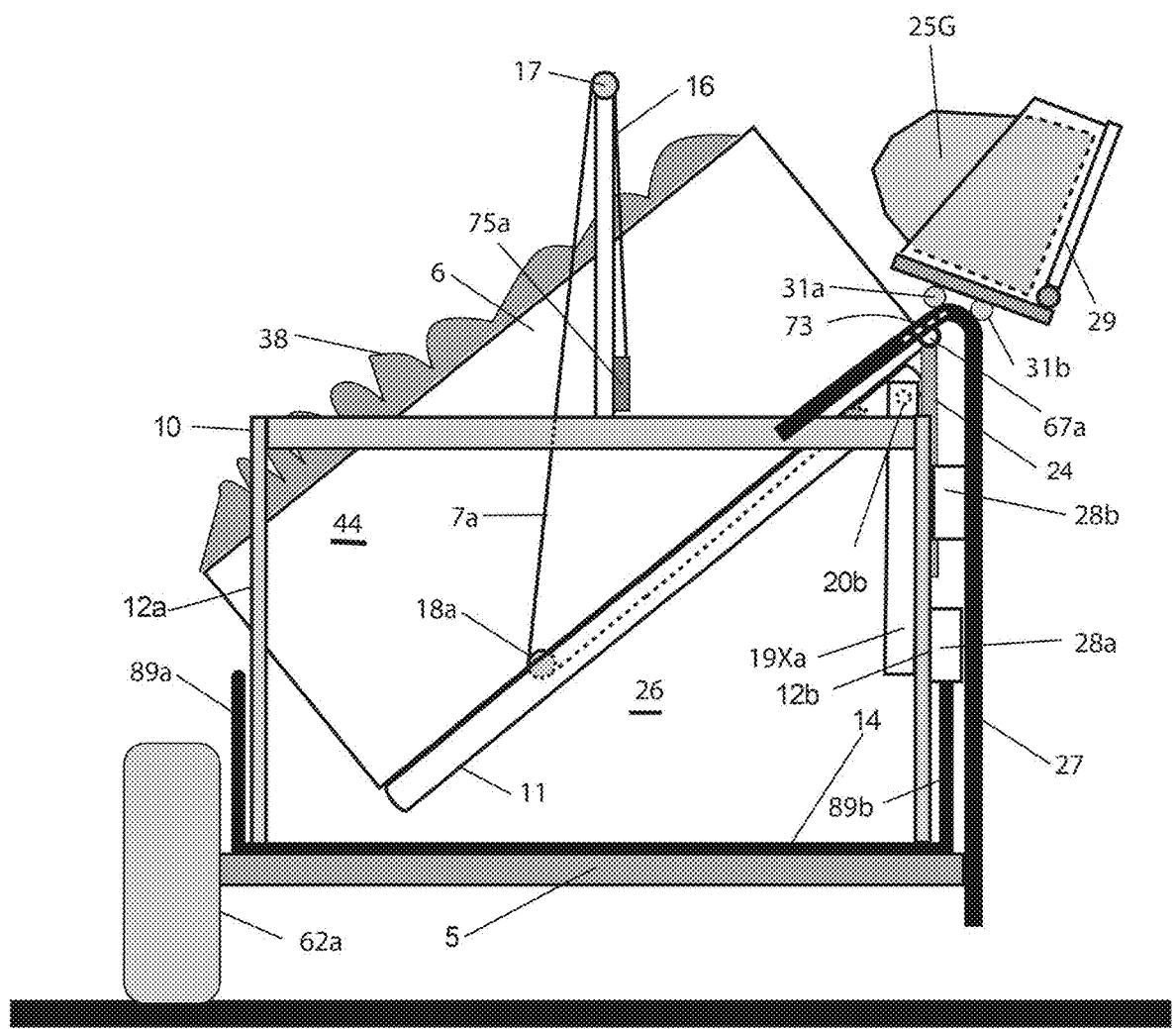
FIG. 22 is an end view of dump system equipped with tracks mounted to trailer floor with lift container filled with grass clipping nearing the top section of tracks.

FIGS. 18, 19, 20, 21, 22 and 23 are end views of the trailer 5 with the dump system 9 pivoted downward from the axle stubs 20*b* and 20*a* (FIG. 17) with the lift frame container 44 empty at a negative angle of approximately 45 degrees for loading via a lift track assembly 27 and a fold-able lift container 29. A wheel 62*b* is removed. When not in use, the fold-able lift container 29 remains closed and folded so it doesn't stick out beyond the location of the tire 62*b* (FIG. 9) and cause a hazard while driving. Also shown is the gate 24 in a closed position. The track assembly 27 is secured to the base frame 10 via a set of track supports 28*a* and 28*b* and track supports 28*c* and 28*d* (FIG. 24). In FIG. 19, the fold-able lift container 29 is open and ready for filling. A grass container 93 on the lawnmower 37 is loaded with the freshly cut grass clippings 25G and in position for dumping its' load. By equipping the trailer 5 and the dump system 9 with the lift track 27 and the fold-able lift container 29, the lawnmower 37 can even be operated with robotic mowers resulting in the automated cutting, handling, transport and disposal of the grass clippings 25G. In FIG. 20, fold-able lift container 29 has been filled with the grass clippings 25G after the grass container 93 on the lawnmower 37 has been dumped and emptied. In FIG. 21, the gate cable 73 has been unfastened from gate 24 and attached to the lift container 29 to provide the up and down motion of fold-able lift container 29 on track assembly 27. In FIG. 22, the foldable lift container 29, filled with about 100 lbs. of the grass clippings 25G, has been lifted up to the top of the lift track assembly 27 via a cable 73 and the gate hydraulic cylinder 71 (FIG. 15).

Figure 23:
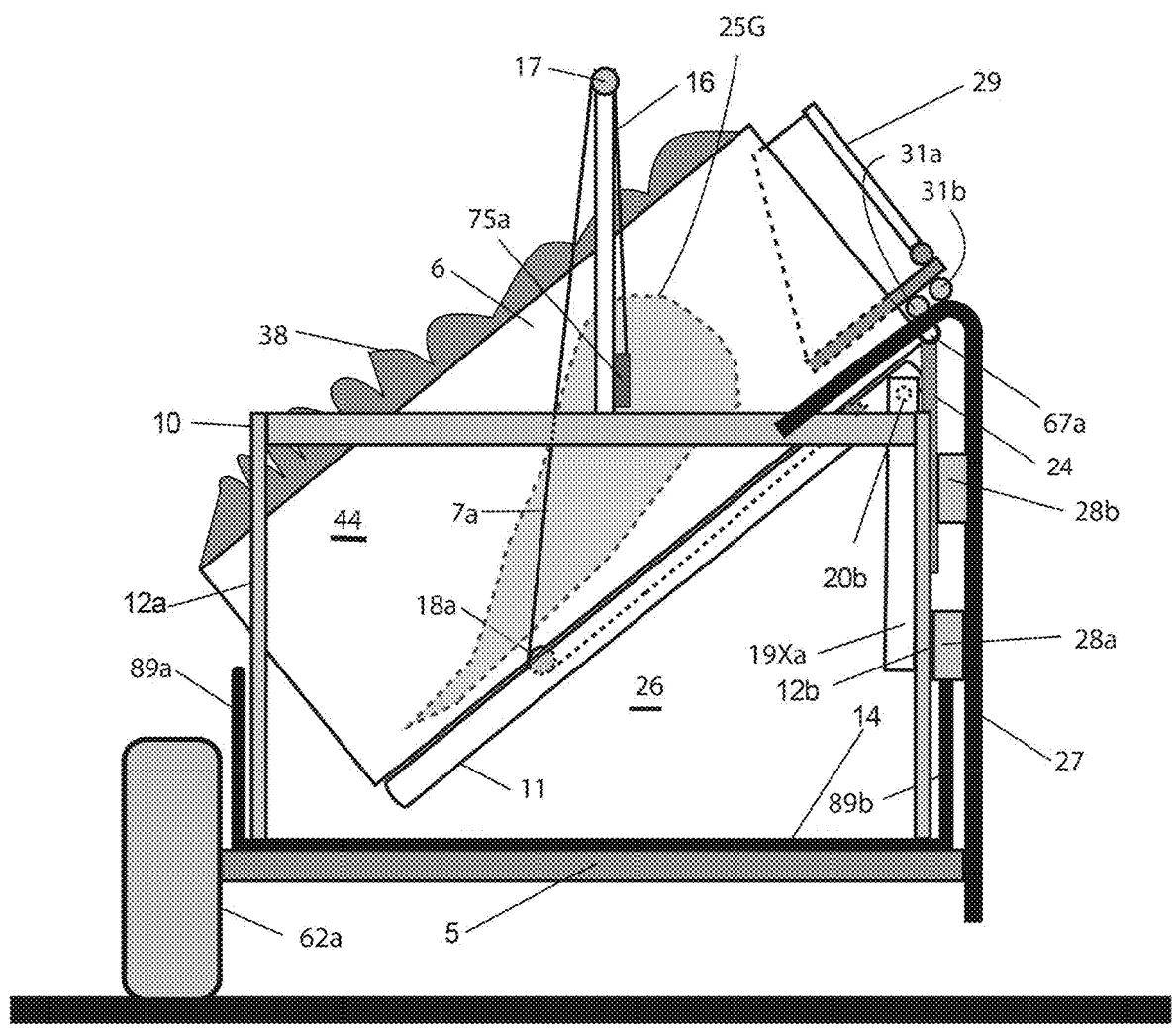
FIG. 23 is an end view of dump system equipped with track components with lift container positioned partially inside bulk container after grass clippings slide towards rear wall of bulk container.
Figure 24:
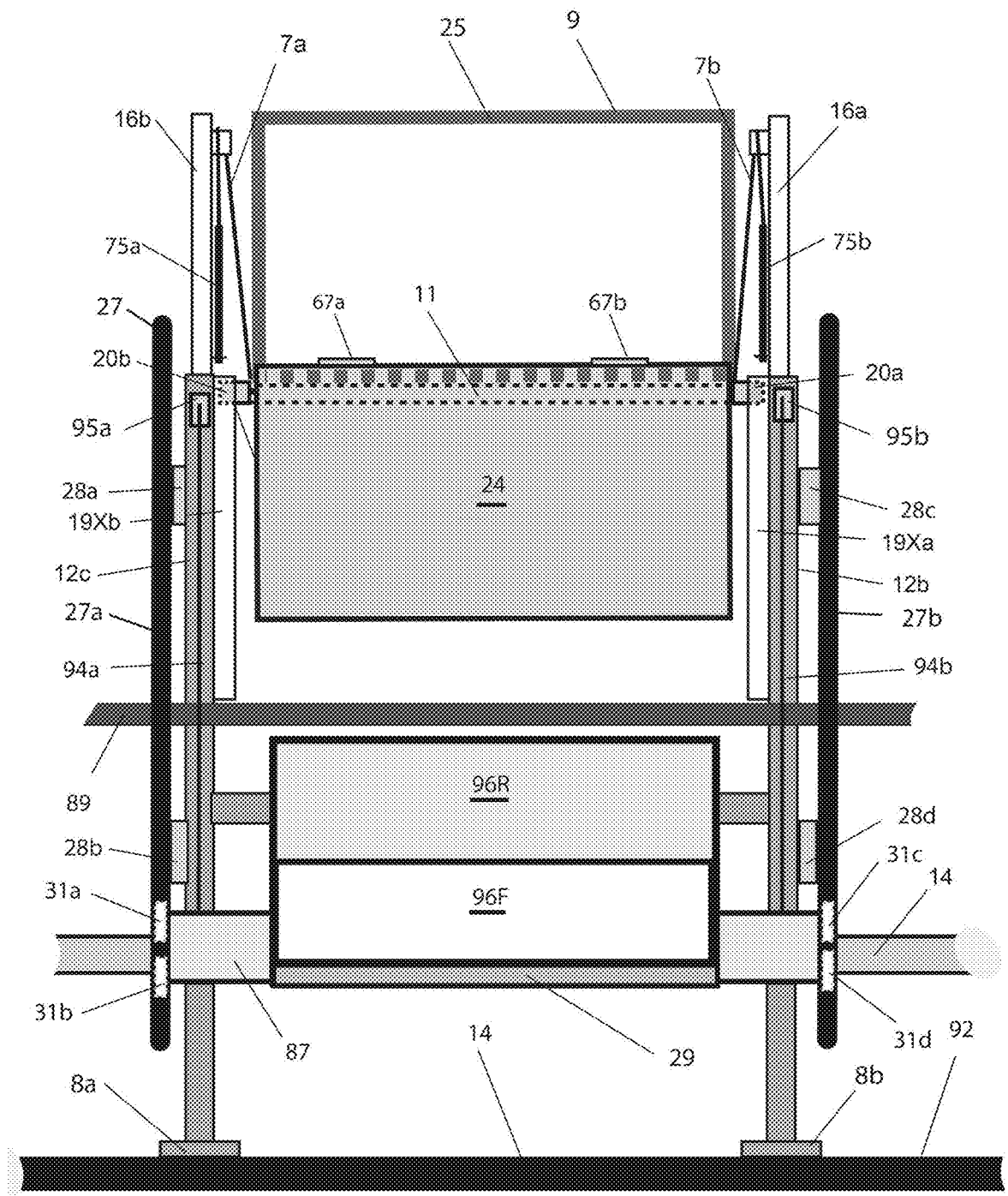
FIG. 24 is a front view of dump system mounted on a landscape trailer equipped with a perimeter rail assembly with the gate of the bulk container open for filling via the track and lift container assembly.

In FIG. 23, the fold-able lift container 29 is shown partly inside the dump frame container 44 after dumping load of the grass clippings 25G. As shown, to prevent a block up the grass clippings 25G inside the dump frame container 44 and/or to eliminate the operator from interrupting his mowing and risk a tick bite by having to push the grass clippings 25G into the dump frame container 44, the negative 45 degree angle of the lift frame 11 helps move and/or slide to the rear wall 90 of the dump frame container 44. After the operator dumps the load of the grass clippings 25G, he can simply press a button to start and complete an automatic lifting and dumping cycle using the fold-able lift container 29 and the lift track assembly 27 to save time and keep mowing.

FIG. 24 is a front view of the dump system 9 mounted on the trailer floor 14 via a set of mounting plates 8a and 8b. As shown, the gate 24 is manually opened and hanging downward in a vertical position via the gate hinges 67a and 67b. Notice that the track lift assembly 27 is positioned inside a trailer rail 89 so that the up and down movement of the lift container 29 can travel freely from the ground 92 to the gate frame 25. The lift container 29 is attached to a container wheel beam 87 as well as a lift container cable 94a and 94b while a set of container wheels 31a, 31b, 31c and 31d are held in track assembly 27. Because the gate cable 73 is relatively short and not long enough, it has been replaced by the lift container cables 94a and 94b.

Figure 25:
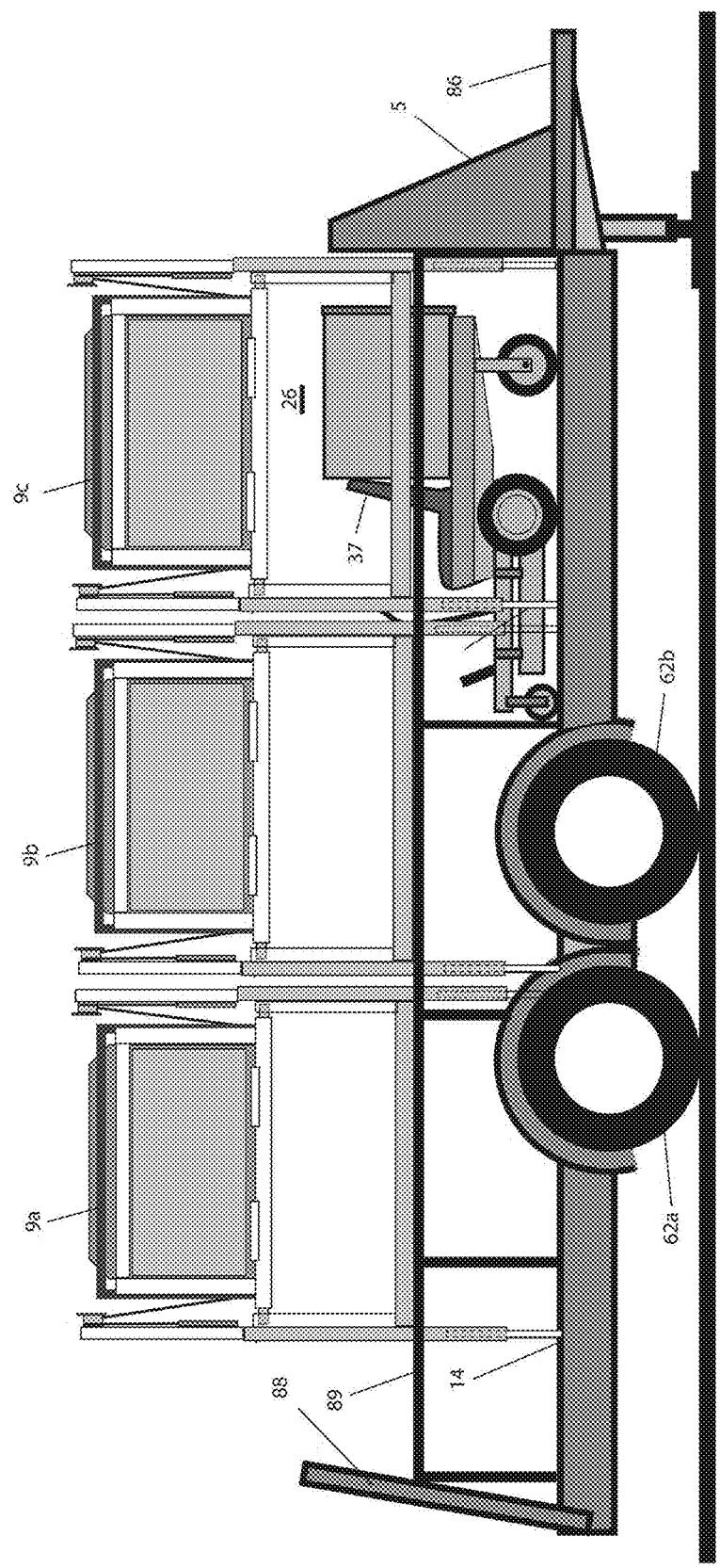
FIG. 25 is a side view of landscape trailer equipped with 3 dump systems, the dump system at the front of the trailer having a lawnmower stowed beneath it.
Figure 26:
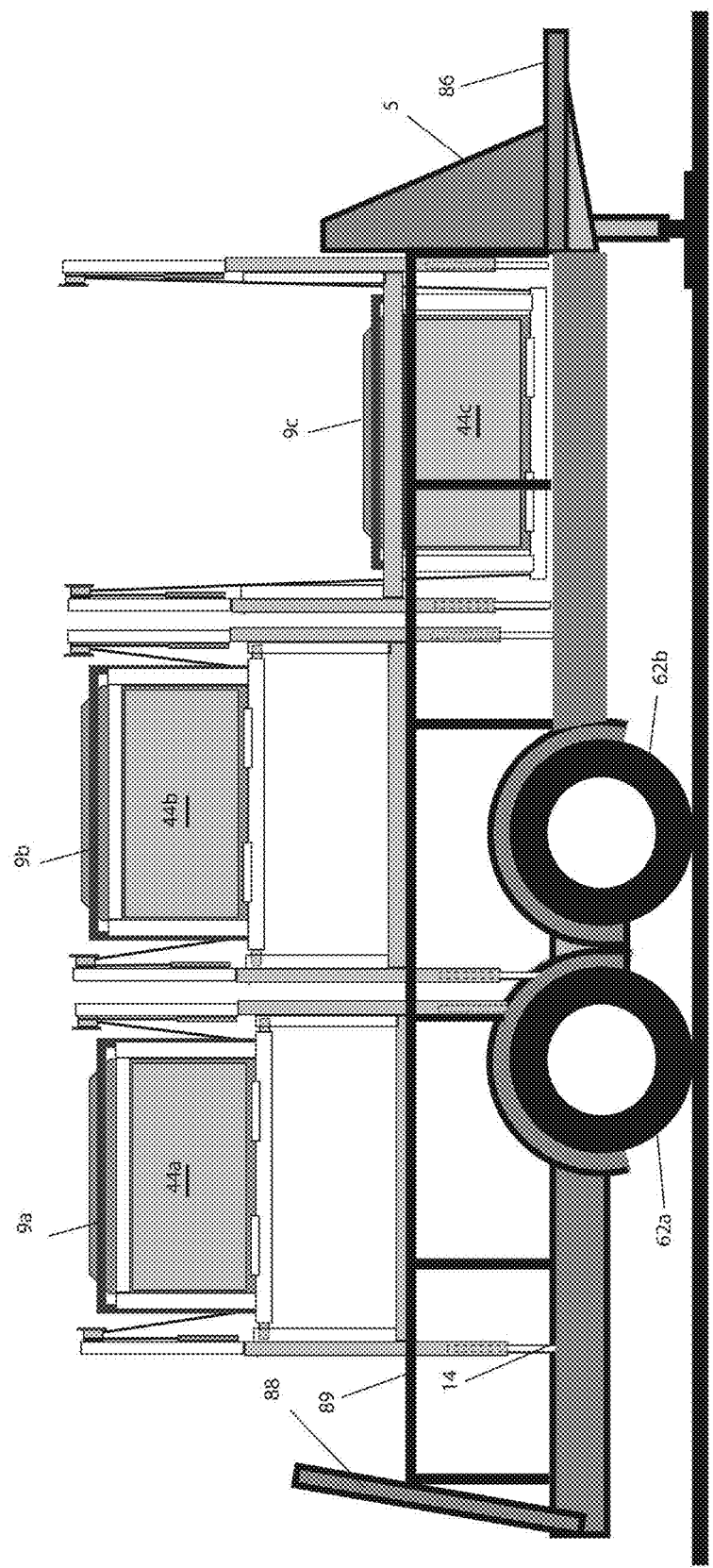
FIG. 26 is a side view of a landscape trailer equipped with 3 dump systems, the dump system at the front of the trailer has its lift frame and bulk container lowered and resting on trailer floor.

FIGS. 25 and 26 are side views of the trailer 5 with the dump systems 9a, 9b and 9c installed. Also shown is the lawnmower 37 parked under the dump system 9c illustrating that virtually no floor space on the trailer 5 has been lost for carrying landscape equipment For certain landscape operators, having the dump system 9a filled with mulch, dump system 9b filled with soil and using the dump system 9c for the removal of grass clippings 25G from a job site provides many obvious advantages, efficiencies and savings such a reduced need to deliver materials via a separate dump trailer, truck and driver. In FIG. 26, lift frame container 44c on the dump system 9c has been lowered to the floor 14 of the trailer 5 to haul loads of heavy weight materials such as sand at 90 pounds/cubic foot compared to the grass clippings 25G at 20 pounds/cubic foot Hauling a heavy load above trailer floor 14 level like sand could create a 'top heavy condition' which could make the trailer 5 unstable as well as a hazard on the highway.

Figure 27:
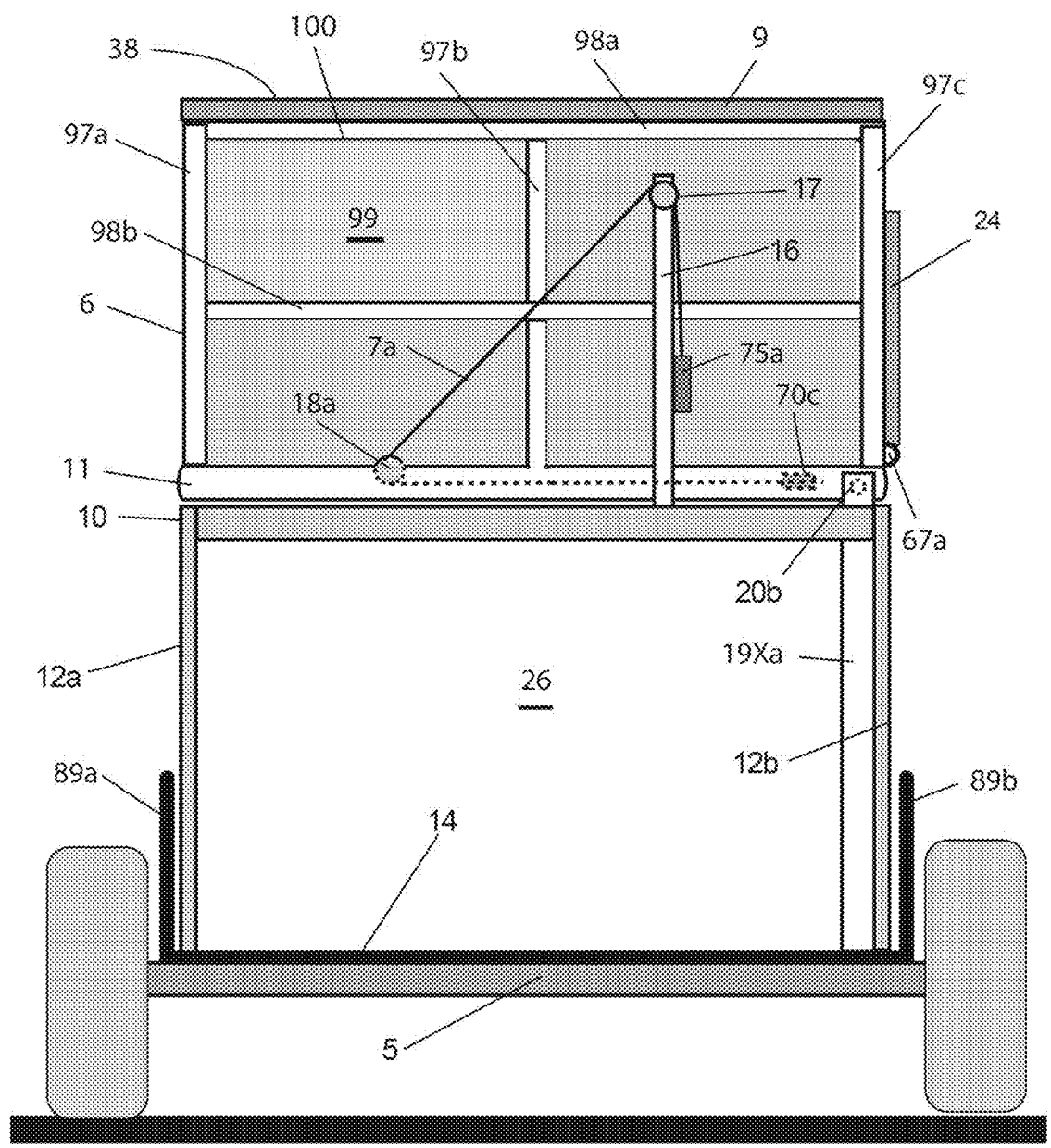
FIG. 27 is an end view of dump system mounted to landscape trailer floor equipped with a flexible container supported by a rigid and collapsible framework consisting of posts and rails.
Figure 28:
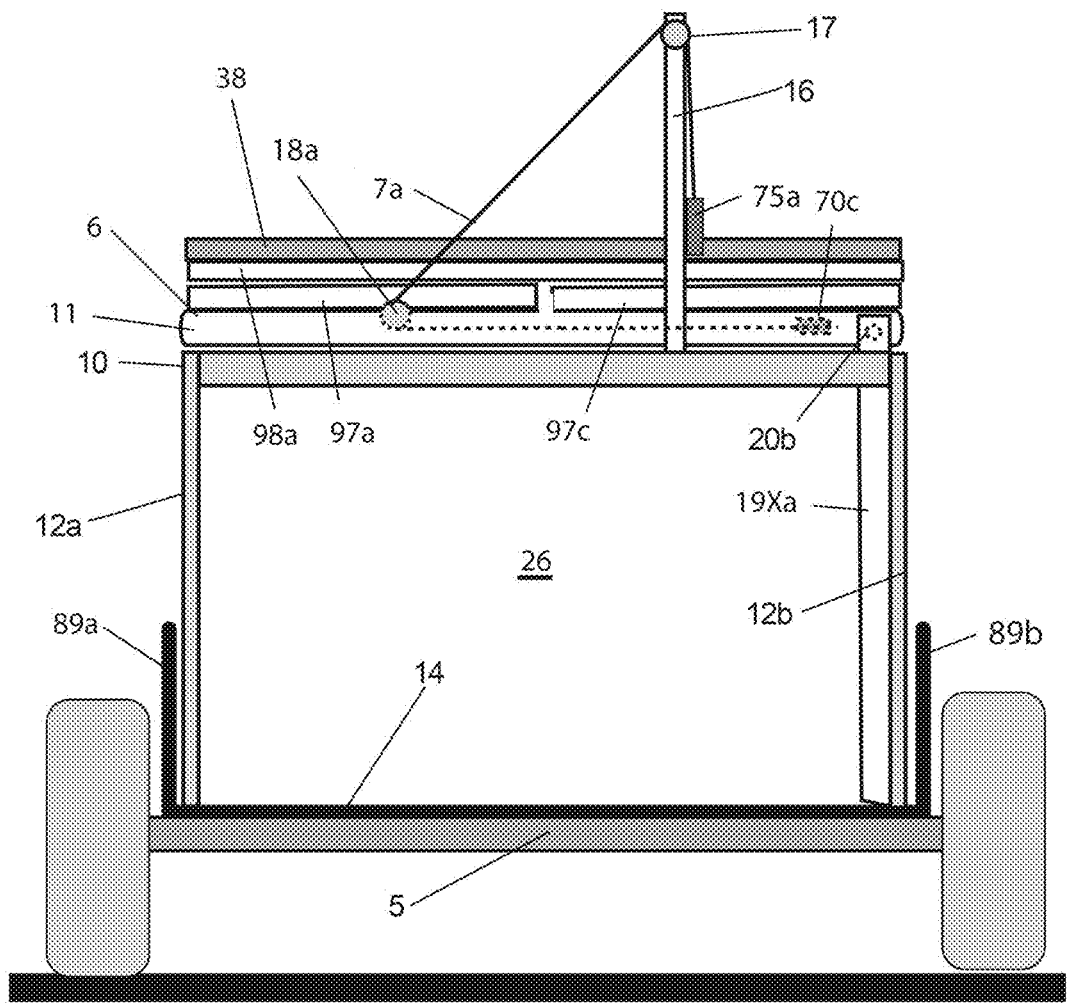
FIG. 28 is an end view of dump system mounted to landscape trailer floor with the rigid container framework collapsed with the flexible container protected inside.

FIGS. 27 and 28 are end views of the dump system 9 equipped with a flexible container 99 attached to the lift frame 11. In FIG. 27, the flexible container 99 is shown in an open position and supported via a container framework assembly 100 installed on the lift frame 11. The container framework assembly 100 is fold-able and/or collapsible consisting of a set of container posts 97a, 97b and 97c and corresponding container posts that are not shown along with a set of container rails 98a, 98b and corresponding container rails not shown. Also shown is the expandable cover 38 and the gate 24. In FIG. 28, the container framework assembly 100 of the dump system 9 is shown in a collapsed position with the flexible container 99 (FIG. 27) protected inside, providing the user with a more aerodynamic shape for transporting trailer 5 in a partially or empty condition.

Figure 29:
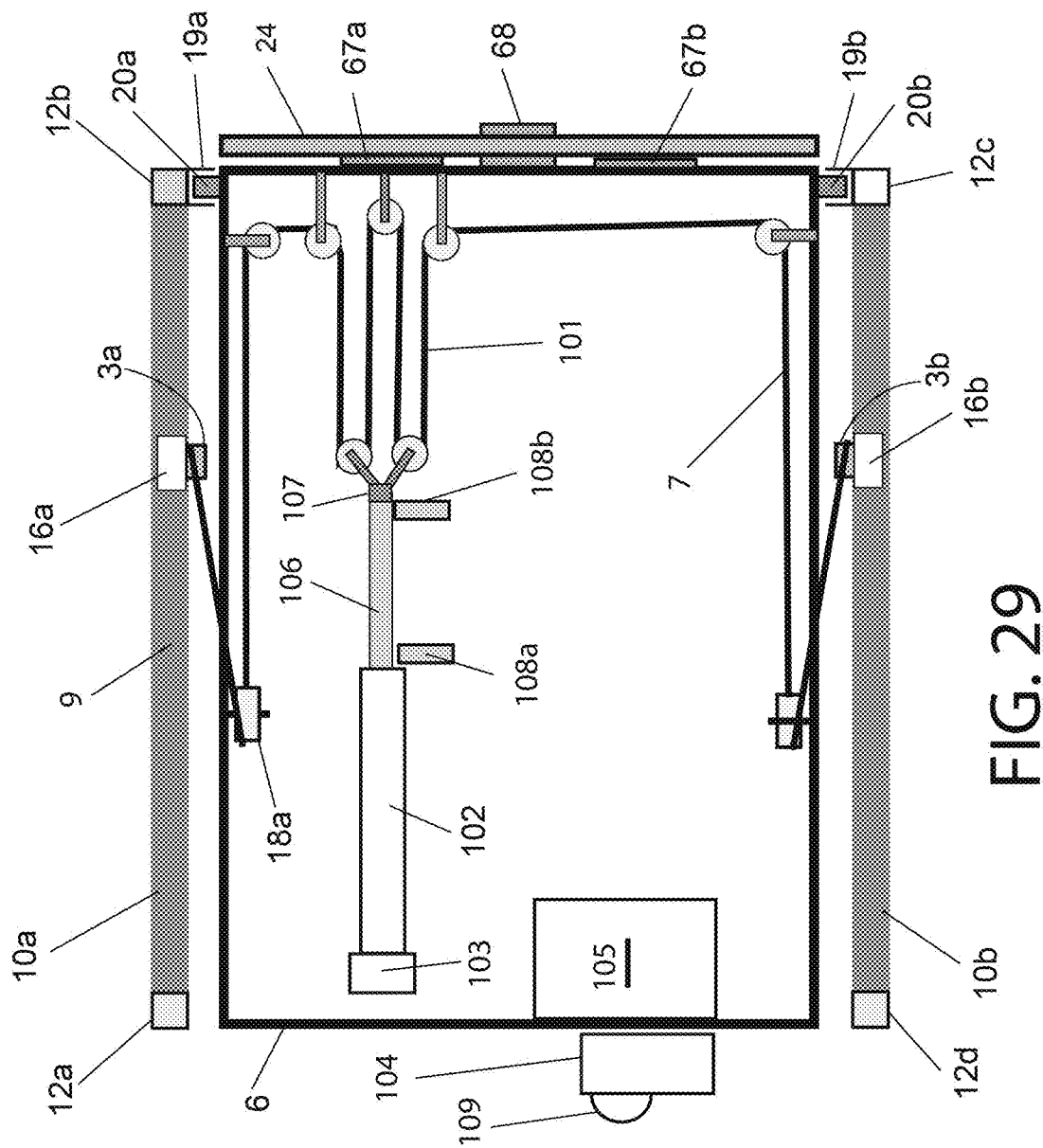
FIG. 29 is a top view of the lift platform and base frame equipped with a linear actuator, load cell, limit switches and other controls.

FIG. 29 is a top view of the lift frame assembly 6 with a linear actuator 102 installed with an extension rod 106 capable of acting as a brake as well as moving back and forth to change the position of a dual pulley bracket 107 which in turn moves the lift frame assembly 6 up and down on the base frame 10. Attached to the linear actuator 102 is a load cell 103 which is used to weigh the load placed on the dual pulley bracket 107. Also shown are a set of limit switches 108a and 108b which can help control the end point movements of the extension rod 106 which in turn controls the positions of the lift frame 6. The linear actuator 102, the load cell 103, a weight display 104, a weight adjustment dial selector 109 and a controller 105 are connected via control wiring. To prevent damage, potential hazards and dangerous operation from over loading the lift frame 6, a set weight limit can shut the linear actuator 102 off when an overweight load condition is reached.

REFERENCE NUMBERS

3 Cable Anchor
5 Trailer
6 Lift Frame Assembly
6Z Lift Frame End
7 Lift Cable
8 Mounting Plate
9 Dump System
10 Base Frame
10B Base Frame Beam
10E Base Frame Extension Beam
11 Dump Frame
11F Dump Frame Floor
12 Base Leg
13 Trailer Floor
16 Cable Lift Post
17 Cable Guide
18 Guide Pulley
19 Container Frame
19X Axle Bracket
21 Axle Stub
24 Gate
25 Gate Frame 25G Grass Clippings
26 Mower Storage Area
27 Lift Track
28 Track Support
29 Foldable Lift Container
29H Container Hinge
29W Container Wall
29F Container Floor
31 Container Wheel
37 Commercial Mower
38 Expandable Cover
44 Dump Frame Container
45 Side Wall Post
46 Top Rail
47 Frame Beam 48 Adjustable Leg Inserts
64 Primary Lift Hydraulic Platform Cylinder
65 Cylinder Rod
66 Cylinder Rod Bracket
67 Gate Hinge
68 Gate Spring
69 Rod Pulley
70 Fixed Pulley Assembly
70V Vertical Pulley
71 Gate Hydraulic Cylinder
72 Gate Pulley
73 Gate Cable
74 Cable Anchor
75 Turnbuckle
76 Front Lift Hydraulic Cylinder
79 Vertical Lift Cable Anchor
80 Front Lift Cable
81 Hydraulic Hose
82 Hydraulic Outflow Valve
83 Hydraulic Return Valve
84 Hydraulic Pump System
85 Hose Collection Area
86 Trailer Hitch
87 Container Wheel Beam
88 Trailer Gate
89 Trailer Rail
90 Rear Wall
91 Gate Opening
92 Ground
93 Grass Container
94 Lift Container Cable
95 Lift Pulley
96F Container Front Wall
96R Container Rear Wall
97 Container Post
98 Container Rail
99 Flexible Container
100 Container Framework Assembly
101 Cable and Pulley Assembly
102 Linear Actuator
103 Load Cell
104 Weight Display
105 Controller
106 Extension Rod
107 Dual Pulley Bracket
108 Limit Switch
109 Weight Adjustment Switch

I claim:

1. A dump system (9) for loading and discharging bulk material (25G), the dump system comprising:
a lift frame assembly (6) and a base frame assembly (10);
the lift frame assembly (6) comprising:
a container (23, 44), the container comprising:
a gate opening (91) on a vertical side of the container;
a gate (24) rotatably attached to the container by a gate hinge (67a, 67b) secured proximate to a lower end of the gate opening (91); and
axle brackets (19a, 19b) secured on vertical sides of the container (23, 44) proximate the gate (24);
a dump frame (11), the dump frame comprising:
a frame floor (11F), the container (23, 44) disposed on the frame floor (11F); and
a guide pulley (18a, 18b) secured to the dump frame (11) between a middle of the container (23, 44) and an end opposite the gate (24);
a fixed pulley (70c) secured to the dump frame (11) between the middle of the container (23, 44) and an end closest to the gate (24); and
axle stubs (20a, 20b) secured to the end of the dump frame (11) closest to the gate (24);
a gate cable (73) secured at one end to the gate (24) capable of lifting the gate loaded with bulk material (25G) and closing the gate to transport the bulk material into the container;
a gate hydraulic cylinder (71), the gate cable (73) in operative communication with the gate hydraulic cylinder (71), such that the gate (24) is opened and closed by operation of the gate hydraulic cylinder (71);
a primary lift hydraulic platform cylinder (64); and
a front lift hydraulic cylinder (76);
the base frame assembly (10) comprising:
a left base frame (10a);
a right base frame (10b);
four base legs (12a-12d) secured to and supporting the left base frame (10a) and right base frame (10b) and defining a storage area (26) between the base legs;
axle brackets (19Xa, 19Xb) vertically secured to two of the four base legs (12b, 12c) that are closest to the gate (24), the axle brackets comprising channels sized to receive the axle stubs (20a, 20b) such that they can slide up and down vertically within the channels;
a pulley support (16) secured above the left base frame (10a) and right base frame (10b) at a proximal end of the pulley support;
a turnbuckle (75a) secured to the pulley support (16);
a post pulley (17) secured at a distal end of the pulley support (16);
a cable anchor (3a, 3b) secured to the left base frame (10a) and right base frame (10b); and
a vertical lift cable anchor (79a, 79b) secured to the left base frame (10a) and right base frame (10b);
a lift cable (7) secured at an end to the cable anchor (3a, 3b), routed through the guide pulley (18a, 18b) and in operative communication with the primary lift hydraulic platform cylinder (64) such that the lift frame assembly (6) can be raised, lowered, and angled by operation of the primary lift hydraulic platform cylinder (64); and
a front lift cable (80) secured at an end to the vertical lift cable anchor (79a, 79b) and in operative communication with the front lift hydraulic cylinder (76) such that an end of the lift frame assembly (6) nearest the gate (24) can be raised and lowered by operation of the front lift hydraulic cylinder.

2. The side-discharge dump system of claim 1, further comprising:
a track assembly (27) secured to the base frame assembly (10); and
a foldable lift container (29) configured to fold flat against the track assembly and that engages the track assembly in a sliding relationship.

3. The side-discharge dump system of claim 1, wherein the pulley support (16) is either a pulley post or an overhead frame.

4. The side-discharge dump system of claim 1, wherein the primary lift hydraulic cylinder
is a linear actuator (102), and further comprising:
an extension rod (106) extending from the linear actuator;

a load cell (103) sensing a load on the extension rod; and limit switches (108a, 108b) limiting the travel of the extension rod.

5. The side-discharge dump system of claim 4, further comprising:

a weight display (104);

a weight adjustment dial selector (109); and a controller (105); the controller in communication with the linear actuator, the load cell, the limit switches, the weight display, and the weight adjustment dial selector.

6. The side-discharge dump system of claim 1, lift frame assembly (6) further comprising an expandable cover (38) for covering the open top of the container (23, 44) capable of expanding when the container is filled with bulk material (25G).

7. The side-discharge dump system of claim 1, wherein the storage space (26) is sized to hold a lawnmower (37) within and the dump system (9) is sized to be removably installed on a vehicle trailer (5) such that the dump system is configured to dump the bulk material off to the side of the trailer.

\* \* \* \* \*